(12) United States Patent
Nishimoto et al.

(10) Patent No.: US 7,380,135 B2
(45) Date of Patent: May 27, 2008

(54) DILIGENT CONTROL OF PREVIEW OF STORED CONTENTS

(75) Inventors: Yusei Nishimoto, Tokyo (JP); Tatsuya Kurioka, Tokyo (JP); Seiichi Namba, Tokyo (JP)

(73) Assignee: Nippon Hoso Kyokai, Tokyo (JP)

( * ) Notice: Subject to any disclaimer, the term of this patent is extended or adjusted under 35 U.S.C. 154(b) by 473 days.

(21) Appl. No.: 10/524,601

(22) PCT Filed: Aug. 15, 2003

(86) PCT No.: PCT/JP03/10378

§ 371 (c)(1),
(2), (4) Date: Feb. 14, 2005

(87) PCT Pub. No.: WO2004/021707

PCT Pub. Date: Mar. 11, 2004

(65) Prior Publication Data

US 2006/0155989 A1    Jul. 13, 2006

(30) Foreign Application Priority Data

Aug. 28, 2002   (JP)   ............................. 2002-248812

(51) Int. Cl.
G06F 11/30  (2006.01)
H04L 9/00   (2006.01)
H04N 7/167  (2006.01)

(52) U.S. Cl. ..................... 713/193; 713/161; 713/162; 713/163; 713/164; 713/165; 713/189; 713/190; 713/191; 713/192; 713/194; 380/228; 380/229; 380/230; 380/231; 380/232; 726/2; 726/3; 726/4; 726/5; 726/6

(58) Field of Classification Search ........ 713/161–166, 713/189–194; 380/228–233
See application file for complete search history.

(56) References Cited

U.S. PATENT DOCUMENTS 5,594,794 A    1/1997   Eyer et al.

(Continued)

FOREIGN PATENT DOCUMENTS

JP    08-237632   *   9/1996

(Continued)

OTHER PUBLICATIONS

Patent Abstracts of Japan of JP 11-308595 Dated Nov. 5, 1999.

(Continued)

Primary Examiner—Longbit Chai
(74) Attorney, Agent, or Firm—Ladas and Parry LLP

(57) ABSTRACT

A method of transmitting contents, which are to be received at a reception side where a portion of the contents is previewed while the contents are not accessible for playing other than for a preview purpose, includes the steps of encrypting the contents by a first encryption key, generating information indicative of an elapsed time of the contents that indicates a relationship between positions on a time axis of the contents representing an amount of time that passes as the contents are played and a time count that accrues as a preview time when the contents are previewed, encrypting the first encryption key and the information indicative of an elapsed time of the contents by a second encryption key, thereby generating first encrypted information, encrypting the second encryption key and content-usage control information by a third encryption key, thereby generating second encrypted information, the content-usage control information indicating usage of the contents on the reception side, and transmitting the encrypted contents, the first encrypted information, and the second encrypted information to the reception side.

20 Claims, 10 Drawing Sheets

U.S. PATENT DOCUMENTS 5,774,548 A * 6/1998 Bando et al. ............... 380/212
6,252,964 B1 * 6/2001 Wasilewski et al. ........ 380/282

FOREIGN PATENT DOCUMENTS

| JP | 11-308595 | 11/1999 |
| JP | 2001-128142 | 5/2001 |
| JP | 2002-027417 | 1/2002 |

OTHER PUBLICATIONS

Patent Abstracts of Japan of JP 08-237632 Dated Sep. 13, 1996.
Patent Abstracts of Japan of JP 2001-128142 Dated May 11, 2001.
Patent Abstracts of Japan of JP 2002-027417 Dated Jan. 25, 2002.

* cited by examiner

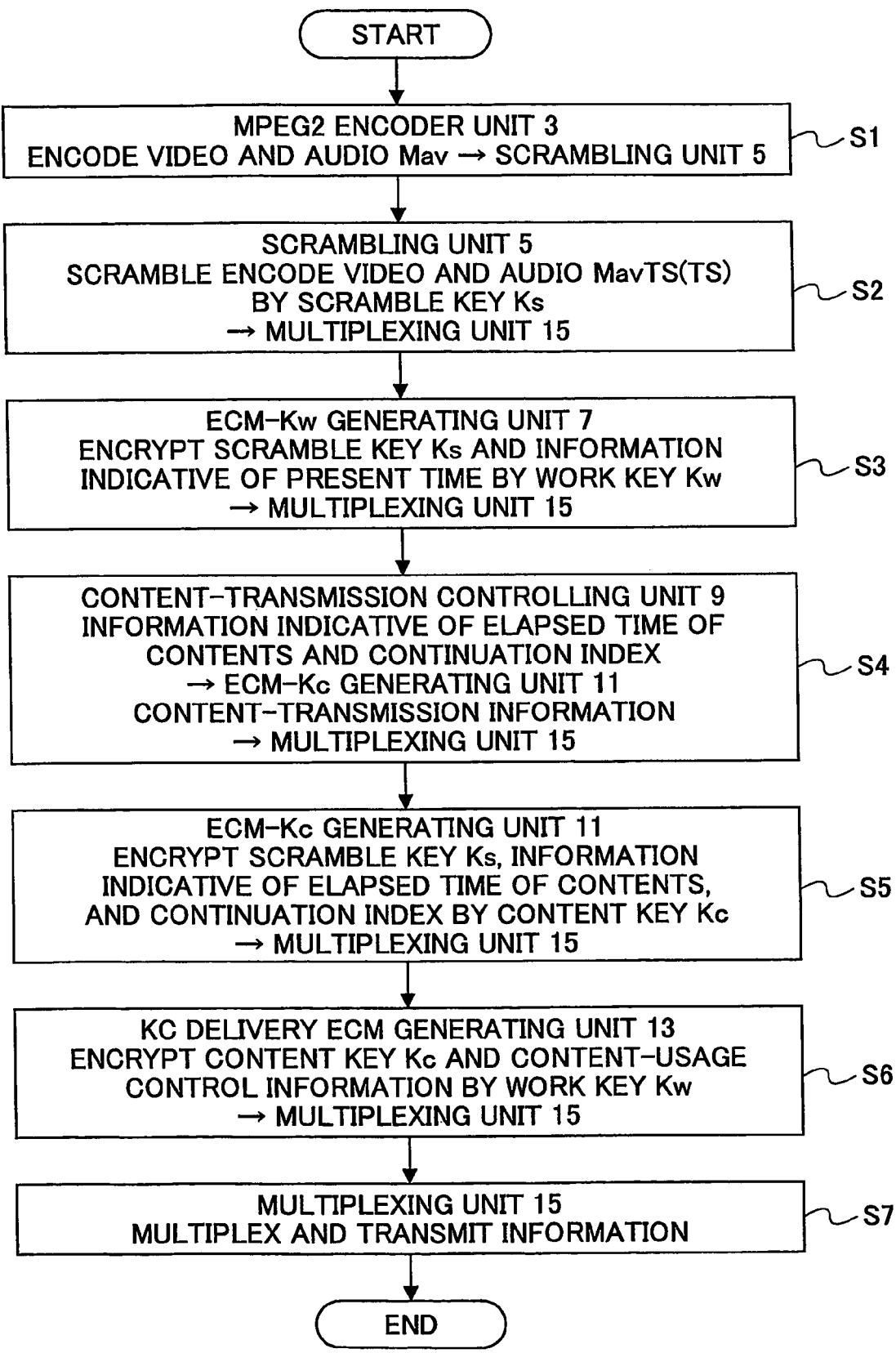

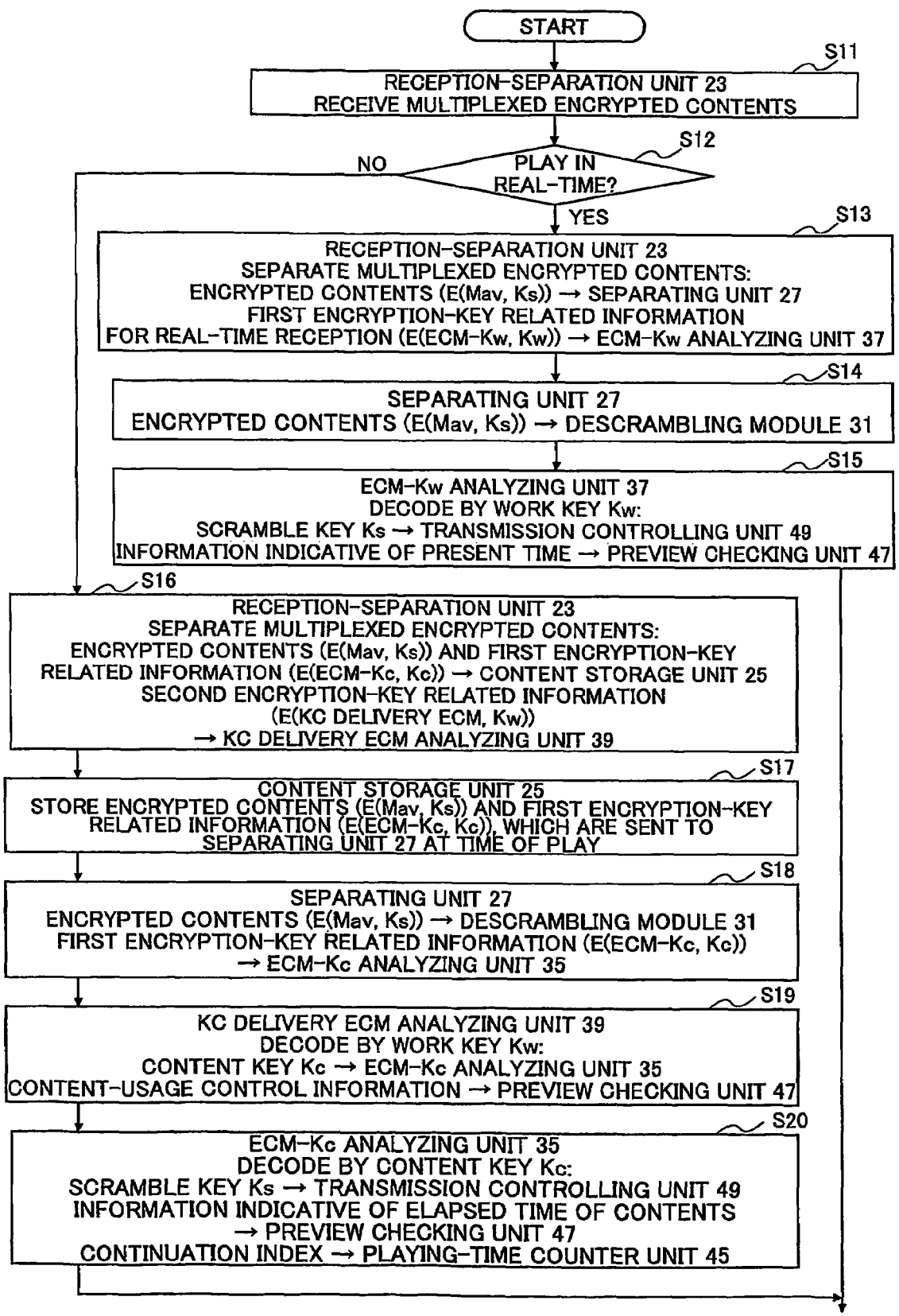

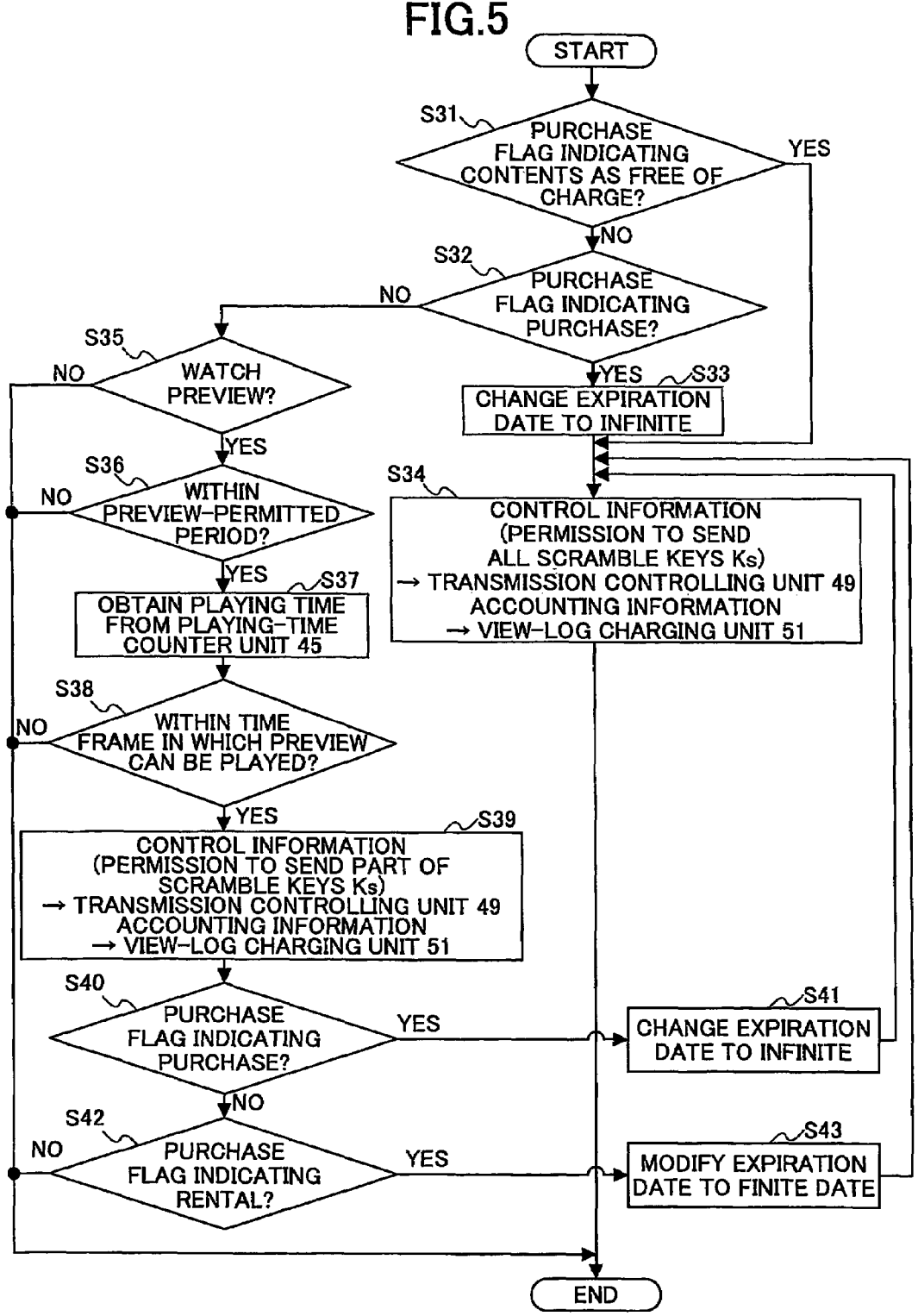

FIG.8A

| EXPIRATION DATE | PREVIEW-START TIME | PREVIEW-END TIME | AUTHORIZED-PREVIEW TIME LENGTH | PURCHASE FLAG |
|---|---|---|---|---|
| 02/08/06 24:00:00 | 00:00:00 | 00:00:15 | 00:00:20 | PF |

FIG.8B

| CONTENT ID | CONTENT KEY Kc | EXPIRATION DATE | PREVIEW-START TIME | PREVIEW-END TIME | AUTHORIZED-PREVIEW TIME LENGTH | PLAYING TIME | PURCHASE FLAG |
|---|---|---|---|---|---|---|---|
| 0x00000001 | 0xAABBCCDD EEFFGGHH··· | 02/08/06 24:00:00 | 00:00:00 | 00:00:15 | 00:00:20 | PT | PF |
| 0x00000002 | | | | | | | |
| 0x00000003 | | | | | | | |
| 0x00000004 | | | | | | | |
| 0x00000005 | | | | | | | |
| 0x00000006 | | | | | | | |
| 0x00000007 | | | | | | | |

DILIGENT CONTROL OF PREVIEW OF STORED CONTENTS

TECHNICAL FIELD

The present invention generally relates to content-transmission methods, apparatus, and programs as well as content-reception methods, apparatus, and programs, and particularly relates to a content-transmission method, apparatus, and program as well as a content-reception method, apparatus, and program which are provided with a fee-charging function while allowing users to preview any desired section of contents stored at the reception side.

BACKGROUND ART

When content providers such as broadcast stations provide contents (e.g., programs) for a fee, i.e., when paid contents (e.g., scrambled contents) are provided to viewers through premium channels, fee-charging systems charge viewers for the viewing of those contents. Such fee-charging systems include a pay-per-view system, which charges fees only when viewers actually watched these contents.

In the pay-per-view system, viewers are generally given a chance to watch part of a premium content (i.e., a descrambled portion of a scrambled content), and, then, perform some action to indicate their consent to pay a fee for the viewing of the content. Such an action is performed on the content-receipt apparatus that belong to the viewers. The viewers will then be charged accordingly.

Methods of allowing viewers to check part of the premium contents include a preview method. The preview method arranges a content such that part of the content scrambled at the content-transmission side can be descrambled for a limited time length from the start of watching the content, as long as it is done within a predetermined time period (e.g., a few months after the delivery of the content). Viewers are not charged for the previewing of the descrambled part of the content. An example of this preview method is described in First Chapter Reference 1.7 "Example of PPV Program Preview Function" of "Conditional Access System Specifications for Digital Broadcasting" (ARIB STD-B25), first edition, that is a standard format set forth by the Association of Radio Industries and Businesses (ARIB).

Contents provided by contents providers such as broadcast stations may be provided in digital form. When PPV broadcast (pay-per-view broadcast) is provided in digital form, ECM (entitlement control message) is used to deliver a scramble key Ks for scrambling of contents, and includes time information indicative of a present time and authorization for a preview. This provides for digital contents (hereinafter referred to simply as "contents") to be previewed.

The preview function as described above is predicated on a case in which the contents are viewed in real-time. As the way the viewers use contents on the reception side diversifies, however, systems are now required to provide for the new ways of viewing contents that are different from the conventional ways of real-time viewing of contents (i.e., purchasing contents after real-time previews). Namely, it is expected to realize a preview method suitable for limited reception that allows viewers to preview part of a stored content at the time of their choosing and purchase the content that they like after watching the preview.

The conventional preview function is predicated upon a case in which the contents are viewed in real-time, and authorization for a preview is given according to the present time index. Thus, the conventional preview function cannot provide for a proper preview authorization check in respect of non-linear reproduction of contents, rewinding of contents, etc., that may need to be performed at the time of playing the stored contents. That is, there is a drawback in that a preview is not possible at the time of playing of stored contents.

The conventional preview function is supposed to work while contents are being received from contents providers such as broadcast stations. This gives rise to a problem in that the conventional preview function cannot handle a preview-purpose content that is specially edited or made for the playing of the content at the content-reception side.

Further, the conventional preview function does not take into account a preview at the time of playing of stored contents, so that it cannot control the length of a preview of the stored contents.

In other words, the conventional preview function is predicated upon the "limited reception" method in which broadcast contents are received and viewed in real-time on the content-reception side, and does not take into account the "limited playing" of contents at reception systems such as home servers by descrambling and playing the contents after storing the scrambled contents of broadcast signals in storage apparatus.

The conventional preview function is suited to a real-time preview operation, and contents can only be stored after watching a preview and purchasing the contents (consenting to the purchase of contents). This is because the limited playing of a content on the content-reception side should allow a stored content to be played from any desired location of a memory medium provided in the storage apparatus, and the use of the conventional preview function would make it possible to freely play rather important portions of the content in a short time period. This means that viewers can watch the premium contents without paying fees. Namely, there is a need for preview control that allows diligent control of position from which the contents are started to play.

Accordingly, there is a need for a content-transmission method, apparatus, and program as well as a content-reception method, apparatus, and program which allow a preview to be watched with respect to stored contents, and can handle edited or created preview-purpose contents, with the capability to control the time length during which contents are previewed as well as the capability to provide further diligent preview control.

DISCLOSURE OF INVENTION

It is a general object of the present invention to provide a content control scheme that substantially obviates one or more problems caused by the limitations and disadvantages of the related art.

Features and advantages of the present invention will be presented in the description which follows, and in part will become apparent from the description and the accompanying drawings, or may be learned by practice of the invention according to the teachings provided in the description. Objects as well as other features and advantages of the present invention will be realized and attained by a content control scheme particularly pointed out in the specification in such full, clear, concise, and exact terms as to enable a person having ordinary skill in the art to practice the invention.

To achieve these and other advantages in accordance with the purpose of the invention, the invention provides a method of transmitting contents, which are to be received at a reception side where a portion of the contents is previewed while the contents are not accessible for playing other than for a preview purpose. The method includes the steps of encrypting the contents by a first encryption key, generating information indicative of an elapsed time of the contents that indicates a relationship between positions on a time axis of the contents representing an amount of time that passes as the contents are played and a time count that accrues as a preview time when the contents are previewed, encrypting the first encryption key and the information indicative of an elapsed time of the contents by a second encryption key, thereby generating first encrypted information, encrypting the second encryption key and content-usage control information by a third encryption key, thereby generating second encrypted information, the content-usage control information indicating usage of the contents on the reception side, and transmitting the encrypted contents, the first encrypted information, and the second encrypted information to the reception side.

Here, a preview of the contents not only means watching general part of the contents or a preview section of the contents, but also means watching any sections such as promotion sections, commercial sections, etc., which are provided in the contents.

The first encryption key may be a scramble key that changes once in a few seconds with passage of time. The second encryption key may be a content key that is provided on a contents-specific basis. The third encryption key may be a work key that is sustained longer than the length of the contents.

The information indicative of an elapsed time of the contents represents an amount of time that passes when the contents are previewed. The amount of time that passes is generally based on the actual length of time, but may depend on a portion of the contents (important scenes, trivial scenes, etc.). For example, the amount of time that passes may be equal to the time that actually passes when the contents are played, or may be denser (i.e., passes faster) than the actual time if the portion of the contents contains important scenes. In such a case, the elapsed time of contents (i.e., time count) may be 2 minutes whereas the amount of time that actually passes is 1 minute.

The content-usage control information defines the specifics of control that is performed when the contents are used (played) on the reception side. This information includes an expiration data setting a time period during which the contents can be used, a preview-start time and preview-end time defining a portion of the contents that can be previewed, an authorized-preview time length specifying a total amount of time that can be spent watching a preview, a purchase flag indicative of whether the contents are free of charge and whether the contents are purchased or rented, etc. Although the content-usage control information is encrypted together with the second encryption key, it may be encrypted together with the first encryption key. Since the information inclusive of the first encryption key is constantly decoded at short time intervals on the receiver side at the time of decoding of contents, encrypting the content-usage control information together with the first encryption key results in slower processing speed, which may not be the most preferable option.

The invention further provides an apparatus for transmitting contents, which are to be received at a reception side where a portion of the contents is previewed while the contents are not accessible for playing other than for a preview purpose. The apparatus includes the steps of a content encrypting unit which encrypts the contents by a first encryption key, a content-transmission controlling unit which generates information indicative of an elapsed time of the contents that indicates a relationship between positions on a time axis of the contents representing an amount of time that passes as the contents are played and a time count that accrues as a preview time when the contents are previewed, a first encrypting unit which encrypts the first encryption key and the information indicative of an elapsed time of the contents by a second encryption key, thereby generating first encrypted information, a second encrypting unit which encrypts the second encryption key and content-usage control information by a third encryption key, thereby generating second encrypted information, the content-usage control information indicating usage of the contents on the reception side, and a transmission unit which transmits the encrypted contents, the first encrypted information, and the second encrypted information to the reception side.

According to another aspect of the invention, the apparatus as described above may be such that the content-transmission control unit generates the information indicative of an elapsed time of the contents such that the time count linearly corresponds to the time axis of the contents.

According to another aspect of the invention, the apparatus as described above may be such that the content-transmission control unit generates the information indicative of an elapsed time of the contents such that the time count is not evenly assigned to the the time axis of the contents.

With this configuration, the elapsed time of contents is not equal to the actual passage of time when the contents are played, but varies depending on a portion of the contents. Accordingly, the reception side having an apparatus with a preview function can readily control a preview of contents according to the intention of the transmission side (i.e., the intention of the producer such as a broadcast station that produced the contents).

According to another aspect of the invention, the apparatus as described above may be such that the content-transmission control unit generates the information indicative of an elapsed time of the contents such that the time count decreases with passage of time on a portion of the time axis of the contents, and increases with passage of time on another portion of the time axis of the contents.

With this configuration, the elapsed time of contents is not equal to the actual passage of time when the contents are played, but decreases or increases depending on a portion of the contents. At the transmission side, a setting may be made to run a preview time faster for the highlight portion of contents. As a result of this, viewers having an apparatus with a preview function may have a growing desire to watch the entire contents at the reception side. This entices viewers to the purchase of contents.

According to another aspect of the invention, the apparatus as described above may be such that a preview-purpose content is attached to the contents at a start of the contents.

This makes it possible to present a preview-purpose content that matches the intention of the producer side, to the viewers who have an apparatus with a preview function.

According to another aspect of the invention, the apparatus as described above may be such that the content-usage control information includes a purchase flag for indicating whether the contents are purchased or rented on the reception side, the purchase flag being returned from the reception side for confirmation of a payment of a fee for the contents.

According to another aspect of the invention, the apparatus as described above may be such that the transmission unit transmits the second encrypted information separately from the encrypted contents and the first encrypted information in response to a request from the reception side.

The invention further provides a machine-readable medium having a program embodied therein for causing a computer to transmit contents, which are to be received at a reception side where a portion of the contents is previewed while the contents are not accessible for playing other than for a preview purpose. The program includes a content encrypting unit which encrypts the contents by a first encryption key, a content-transmission controlling unit which generates information indicative of an elapsed time of the contents that indicates a relationship between positions on a time axis of the contents representing an amount of time that passes as the contents are played and a time count that accrues as a preview time when the contents are previewed, a first encrypting unit which encrypts the first encryption key and the information indicative of an elapsed time of the contents by a second encryption key, thereby generating first encrypted information, a second encrypting unit which encrypts the second encryption key and content-usage control information by a third encryption key, thereby generating second encrypted information, the content-usage control information indicating usage of the contents on the reception side, and a transmission unit which transmits the encrypted contents, the first encrypted information, and the second encrypted information to the reception side.

The invention further provides a method of controlling encrypted contents that are received from a transmission side, wherein a portion of the encrypted contents is previewed while the encrypted contents are not accessible for playing other than for a preview purpose. The method includes the steps of separating received contents into the encrypted contents, first encrypted information, and second encrypted information, the first encrypted information including a first encryption key and information indicative of an elapsed time of contents as encrypted by a second encryption key, and the second encrypted information including the second encryption key and content-usage control information as encrypted by a third encryption key, storing the encrypted contents and the first encrypted information in storage, decoding the second encrypted information by the third encryption key so as to obtain the second encryption key and the content-usage control information, decoding the first encrypted information stored in the storage by the obtained second encryption key so as to obtain the first encrypted key and the information indicative of an elapsed time of contents, checking whether a preview of the portion of the encrypted contents is permitted based on the information indicative of an elapsed time of contents and the content-usage control information, and decoding the portion of the encrypted contents by the first encrypted key in response to a check result that a preview of the portion of the encrypted contents is permitted, wherein the information indicative of an elapsed time of contents indicates a relationship between positions on a time axis of contents representing an amount of time that passes as the contents are played and a time count that accrues as a preview time when the contents are previewed.

Here, the first through third keys may be a scramble key, a content key, and a work key, respectively.

The invention further provides an apparatus for controlling encrypted contents that are received from a transmission side, wherein a portion of the encrypted contents is previewed while the encrypted contents are not accessible for playing other than for a preview purpose. The apparatus includes a separating unit which separates received contents into the encrypted contents, first encrypted information, and second encrypted information, the first encrypted information including a first encryption key and information indicative of an elapsed time of contents as encrypted by a second encryption key, and the second encrypted information including the second encryption key and content-usage control information as encrypted by a third encryption key, a content storage unit which stores the encrypted contents and the first encrypted information in storage, a first decoding unit which decodes the second encrypted information by the third encryption key so as to obtain the second encryption key and the content-usage control information, a second decoding unit which decodes the first encrypted information stored in the storage by the obtained second encryption key so as to obtain the first encrypted key and the information indicative of an elapsed time of contents, a check unit which checks whether a preview of the portion of the encrypted contents is permitted based on the information indicative of an elapsed time of contents and the content-usage control information, and a content decoding unit which decodes the portion of the encrypted contents by the first encrypted key in response to a check result that a preview of the portion of the encrypted contents is permitted, wherein the information indicative of an elapsed time of contents indicates a relationship between positions on a time axis of contents representing an amount of time that passes as the contents are played and a time count that accrues as a preview time when the contents are previewed.

According to another aspect of the invention, the apparatus as described above may further include a playing-time counter unit which counts the time count as the portion of the encrypted contents is decoded for playing, and a charging unit which charges a fee commensurate with the time count counted by the playing-time counter unit, wherein the check unit compares the time count with an authorized-preview time length defined in the content-usage control information, and the charging unit refrains from charging a fee until the time count exceeds the authorized-preview time length.

When the time count exceeds the authorized-preview time length, the preview of the contents is automatically (forcibly) brought to an end. The authorized-preview time length may be set according to the intention of the transmission side. Alternatively, the authorized-preview time length may be selected from ranges of less than one minute, more than or equal to one minute and less than three minutes, and more than or equal to three minutes and less than five minutes, for example, according to the attributes of contents (e.g., short contents or long contents).

According to another aspect of the invention, the apparatus as described above may be such that the playing-time counter unit counts the time count based on a continuation index that is provided to correspond to a unit time by which the first encryption key changes.

With this configuration, the playing-time counter unit properly counts the time count with respect to nonlinear reproduction. The nonlinear reproduction refers to a discontinuous reproduction (e.g., play and skip). The playing-time counter unit uses the continuation index to detect a point of discontinuity at the time of play and skip, thereby setting the time count to zero during the skipping operation. With this provision, only the time that is actually spent playing the contents is counted.

According to another aspect of the invention, the apparatus as described above may be such that the check unit is provided inside a security module that protects information therein from external access such as to prevent reading of the information.

With this configuration, the check unit compares the time count with the authorized-preview time length inside the security module. Inside the security module, there is no risk of having the time count and the authorized-preview time length tampered by illegal access. This ensures proper check operation. The security module is implemented as an IC card or the like.

According to another aspect of the invention, the apparatus as described above may be such that the charging unit is provided inside the security module, and generates content-history information by combining the time count counted by the playing-time counter unit with the content-usage control information, the content-history information being paired up with content IDs, which are assigned to respective contents.

According to another aspect of the invention, the apparatus as described above may further include an encrypting unit which encrypts the content-history information and the second encryption key by use of an inherent key kept inside the security module if the check unit funds that the time count is smaller than the authorized-preview time length, the content-history information and the second encryption key encrypted by the encrypting unit being stored in the content storage unit.

In general, the content storage unit for storing the encrypted contents is provided outside the security module, so that the content-history information and the second encryption key are encrypted to prevent tampering. If a register function for storing the content-history information and the second encryption key is provided inside the security module, such a function may be utilized as information storage.

According to another aspect of the invention, the apparatus as described above may be such that the second encrypted information is stored in the content storage unit together with the encrypted contents after encryption by the encrypting unit.

In general, the content storage unit for storing the encrypted contents is provided outside the security module, so that the second encrypted information is encrypted to prevent tampering.

According to another aspect of the invention, the apparatus as described above may be such that the charging unit sends a notice to the transmission side through a communication channel, the notice indicating whether the encrypted contents are purchased or rented.

With this provision, the content provider (such as a broadcast station) on the transmission side can check the payment of fees that are charged for the contents.

According to another aspect of the invention, the apparatus as described above may be such that a request for the second encrypted information is sent to the transmission side via a communication channel if the second encrypted information is not included in the received contents, and a fee for the encrypted contents is charged when the charging unit receives the second encrypted information.

The invention further provides a machine-readable record medium having a program embodied therein for causing a computer to control encrypted contents that are received from a transmission side, wherein a portion of the encrypted contents is previewed while the encrypted contents are not accessible for playing other than for a preview purpose. The program includes a separating unit which separates received contents into the encrypted contents, first encrypted information, and second encrypted information, the first encrypted information including a first encryption key and information indicative of an elapsed time of contents as encrypted by a second encryption key, and the second encrypted information including the second encryption key and content-usage control information as encrypted by a third encryption key, a content storage unit which stores the encrypted contents and the first encrypted information in storage, a first decoding unit which decodes the second encrypted information by the third encryption key so as to obtain the second encryption key and the content-usage control information, a second decoding unit which decodes the first encrypted information stored in the storage by the obtained second encryption key so as to obtain the first encrypted key and the information indicative of an elapsed time of contents, a check unit which checks whether a preview of the portion of the encrypted contents is permitted based on the information indicative of an elapsed time of contents and the content-usage control information, and a content decoding unit which decodes the portion of the encrypted contents by the first encrypted key in response to a check result that a preview of the portion of the encrypted contents is permitted, wherein the information indicative of an elapsed time of contents indicates a relationship between positions on a time axis of contents representing an amount of time that passes as the contents are played and a time count that accrues as a preview time when the contents are previewed.

Other objects and further features of the present invention will be apparent from the following detailed description when read in conjunction with the accompanying drawings.

BRIEF DESCRIPTION OF DRAWINGS

FIG. 3 is a flowchart showing the operation of the content-transmission apparatus.

FIGS. 4A and 4B are a flowchart showing the operation of the content-reception apparatus.

FIG. 5 is a flowchart showing the operation of a preview checking unit.

FIG. 8A is a drawing showing content-usage control information.

FIG. 8B is a drawing showing content-history information.

MODES FOR CARRYING OUT THE INVENTION

In the following, embodiments of the present invention will be described with reference to the accompanying drawings.

In the following, the constructions of a content-transmission apparatus and a content-reception apparatus will be described first. Then, the operations of the content-transmission apparatus and the content-reception apparatus will be described. Further, a description will be given of information about content time passage, the way the preview time is measured (i.e., computation by a play-time counter unit), content-usage control information, and information about content history. Moreover, contents to which preview-purpose contents are attached in advance will be described in comparison with conventional contents.

[Construction of Content-Transmission Apparatus]

Figure 1:
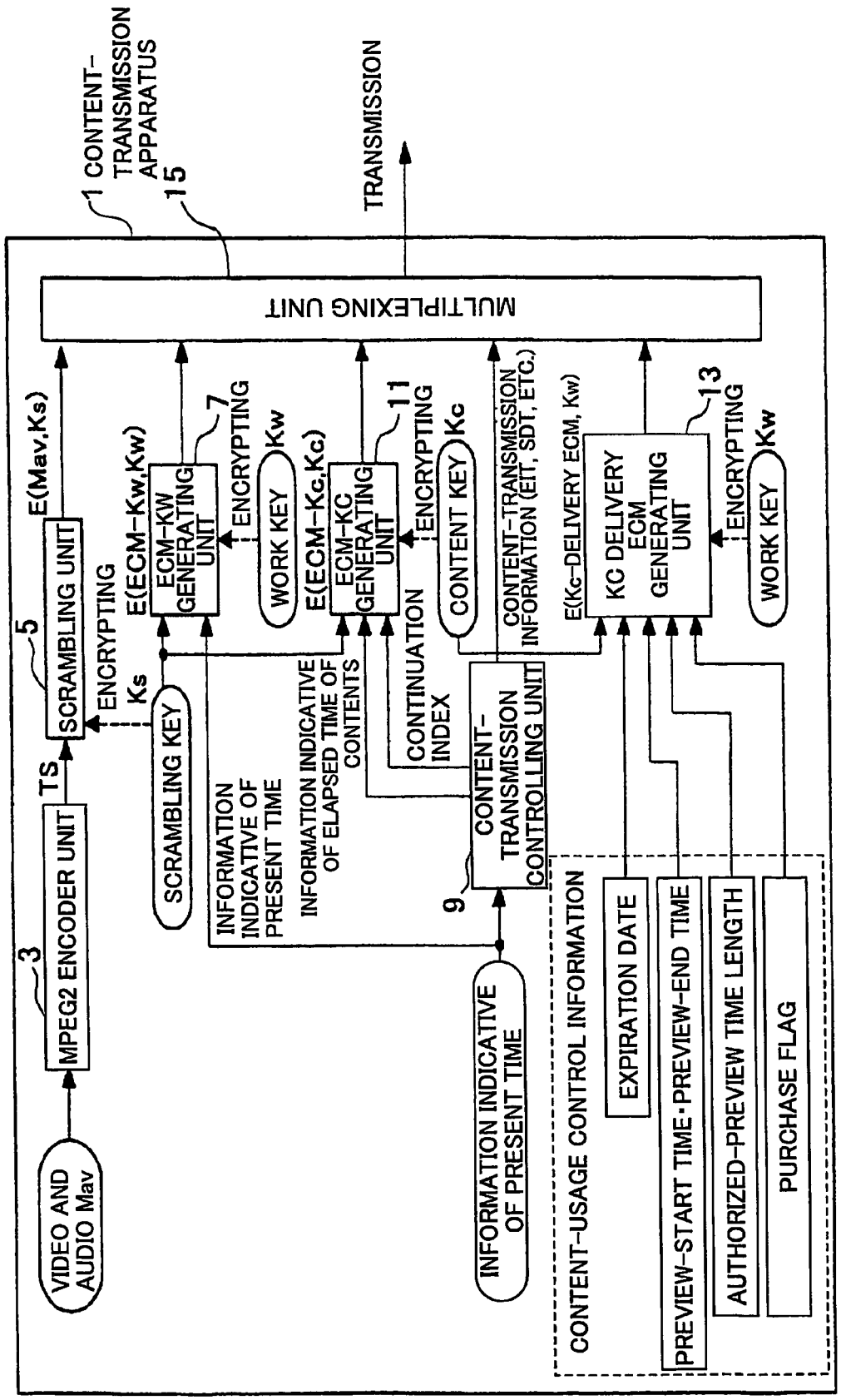
FIG. 1 is a block diagram showing a content-transmission apparatus.

The construction of a content-transmission apparatus will be described with reference to FIG. 1. FIG. 1 is a block diagram showing the content-transmission apparatus. As shown in FIG. 1, a content-transmission apparatus 1 includes an MPEG2 encoder unit 3, a scrambling unit 5, an ECM-Kw generating unit 7, a content-transmission controlling unit 9, an ECM-Kc generating unit 11, a Kc delivery ECM generating unit 13, and a multiplexing unit 15.

The content-transmission apparatus 1 processes contents (programs, video and audio Mav (message audio visual)) such that any desired section (desired position) of the contents can be previewed (in a different manner of viewing) at a content-transmission apparatus (which will be described later in detail) according to the intention of the transmission side. The content-transmission apparatus 1 encrypts the processed contents for transmission. The content-transmission apparatus 1 mainly transmits premium contents, and is configured to charge fees when the owner of a content-reception apparatus that received a premium content views, purchases, or rents this premium content.

The intention of the content-transmission side (i.e., the content-transmission apparatus 1) needs to be reflected by the reception side that receives the contents. To this end, the content-transmission apparatus 1 is configured to transmit content-usage control information together with the contents. A description will be given herein of the content-usage control information.

The content-usage control information is comprised of an expiration date, a preview-start time and a preview-end time, an authorized-preview time length, and a purchase flag.

The expiration date indicates a time period during which the reception side can use (for viewing or the like) the received contents. Namely, the expiration date is equivalent to a date on which a content key Kc expires (which will be described later).

The preview-start time and preview-end time represent a period during which a preview is permitted. If the preview-start time is 11:40 and the preview-end time is 11:43, for example, a time period during which a preview is permitted is 3 minutes. In other words, the preview-start time and preview-end time indicate a portion that can be previewed.

The authorized-preview time length is indicative of the duration of an authorized preview, which may be expressed in seconds or in minutes. If it is set to 30 seconds, for example, the total time length of authorized previews is 30 seconds. Depending on the way the viewers watch previews of the received contents, previews may be played three times, each for the 10-second duration. This authorized preview time length may be set according to the intention of the transmission side, or may be selected from ranges of less than one minute, more than or equal to one minute and less than three minutes, and more than or equal to three minutes and less than five minutes, for example, according to the attributes of contents (e.g., short contents or long contents) classified by content IDs.

The purchase flag indicates whether the content is provided for a fee or provided free of charge. In the case of a fee-charged content, the purchase flag further indicates whether the content is purchased, as well as whether the content is rented by the viewer for a predetermined time period. For example, the purchase flag may be "0" if the content is for a fee but not yet purchased, "1" if the content is for a fee and already purchased, "2" if the content is being rented, and "3" if the content is free of charge. The content-transmission apparatus 1 is provided with a purchase-flag setting unit (not shown), which sets the purchase flag.

In the following, each portion of the content-transmission apparatus 1 will be described.

The MPEG2 encoder unit 3 encodes video-&-audio contents such as video and audio Mav (message audio visual), thereby generating a video-&-audio content stream (TS) in the MPEG2 format. Encoding refers to a process of generating digital codes from video and audio signals. Encoding is generally performed for the purpose of converting analog signals to digital signals, decreasing the redundancy of digital signals, reducing the amount of data to be transmitted or stored by compressing signals, providing for the detection and correction of errors.

The scrambling unit 5 scrambles the video-&-audio content stream (TS) encoded by the MPEG2 encoder unit 3 by use of a scramble key Ks, thereby generating an encrypted content (E(Mav, Ks)). The content-transmission apparatus 1 is provided with a scramble-key generating unit (not shown) for generating the scramble key Ks. Scrambling refers to the encrypting of signals in stream form, and the scramble key Ks is changed once in a few seconds (generally once in a second) as the playing of the content progresses. The scrambling unit 5 may be referred to as a content encrypting unit, and the scramble key Ks may be referred to as a first encryption key.

The ECM-Kw generating unit 7 encrypts the scramble key Ks and information indicative of the present time by use of a work key Kw, thereby generating first encryption-key related information for real-time reception (E(ECM-Kw, Kw)), which is used when the video and audio Mav is played in real-time at the receiver end. The information indicative of the present time is obtained from the present time. If the present time is 8:30:16 p.m. on Aug. 26, 2002, for example, the information indicative of the present time may be "02/08/26 20:30:16".

The first encryption-key related information for real-time reception is ECM (entitlement control message). This first encryption-key related information for real-time reception (E(ECM-Kw, Kw)) is used by a content-reception apparatus on the receiver side to decode the encrypted contents in real-time. The work key Kw is an encryption key that is shared on a long-term basis between the content-transmission apparatus 1 on the transmitter side and the content-reception apparatus on the receiver side. The work key Kw may be referred to as a third encryption key.

The content-transmission controlling unit 9 supplies information indicative of the elapsed time of content and a continuation index to the ECM-Kc generating unit 11, and also supplies content-transmission information to the multiplexing unit 15. The information indicative of the elapsed time of content will be attached to a content, and indicates a time index that starts from 0 second at the start of the content, and increases on a regular or irregular basis according to the content as the time elapses with the playing of the content. Details will be described later. The content-transmission controlling unit 9 may be referred to as a content-transmission controlling unit.

The continuation index is information indicative of time (elapsed time) that will be attached to the content, and indicates an elapsed time according to the time unit by which the scramble key Ks is changed (once in a few seconds (generally once in a second)). The content-transmission information includes EIT (event information table), SDT (service description table), etc., which will be used by the content-reception apparatus on the receiver side when generating an EPG (electronic program guide).

The ECM-Kc generating unit 11 encrypts related information inclusive of the scramble key Ks and the information indicative of the elapsed time of content by use of a content key Kc, thereby generating first encryption-key related information (E(ECM-Kc, Kc)). The related information inclusive of the scramble key Ks includes the scramble key Ks, a provider ID providing the content, a content ID attached to each content, etc.

The content key Kc is an encryption key provided separately with respect to each content. The first encryption-key related information (E(ECM-Kc, Kc)) is used when decoding the encrypted content at the time of playing the encrypted content stored in the content-reception apparatus on the receiver side. The ECM-Kc generating unit 11 may be referred to as a first encrypting unit, and the content key Kc may be referred to as a second encryption key.

The Kc delivery ECM generating unit 13 encrypts related information inclusive of the content key Kc and the content-usage control information by use of a work key Kw, thereby generating second encryption-key related information (E(Kc delivery ECM, Kw)). The related information inclusive of the content key Kc includes the content key Kc, a provider ID providing the content, a content ID attached to each content, identification information attached to the work key Kw, etc. The related information inclusive of the content key Kc and the content-usage control information are collectively referred to as Kc delivery ECM.

The second encryption-key related information is used to provide a preview of the encrypted content at the content-reception apparatus on the receiver side. The Kc delivery ECM generating unit 13 may be referred to as a second encrypting unit.

The multiplexing unit 15 multiplexes the encrypted content (E(Mav, Ks)), the first encryption-key related information for real-time reception (E(ECM-Kw, Kw)), the first encryption-key related information (E(ECM-Kc, Kc)), and the second encryption-key related information (E(Kc delivery ECM, Kw)). The multiplexing unit 15 outputs the multiplexed encrypted content in the MPEG2 transport stream format.

The multiplexing unit 15 is configured to be able to leave the second encryption-key related information (E(Kc delivery ECM, Kw)) out of multiplexing, and multiplexes the encrypted content (E(Mav, Ks)), the first encryption-key related information for real-time reception (E(ECM-Kw, Kw)), the first encryption-key related information (E(ECM-Kc, Kc)). In this case, also, the multiplexing unit 15 outputs the multiplexed encrypted content in the MPEG2 transport stream format. Namely, the multiplexing unit 15 may be able to transmit the second encryption-key related information (E(Kc delivery ECM, Kw)) at the time of its choosing, or may be able to transmit it via a communication-channel network (not shown) in response to a request from the receiver side. The multiplexing unit 15 may be referred to as a transmission unit.

The content-transmission apparatus 1 is provided with a preview-purpose content attaching unit (not shown), which arranges a preview-purpose content at the beginning of the video and audio Mav (i.e., contents) where the preview-purpose content is a portion extracted from the video and audio Mav, and which encrypts the preview-purpose content by use of the content key Kc. The preview-purpose content attached by the preview-purpose content attaching unit is decoded by the content-reception apparatus using the received content key Kc for a preview by the user (viewer) of the content-reception apparatus. With this provision, a preview that is exactly intended by the content-transmission side is provided for the viewer who is considering watching the video and audio Mav (contents).

The content-transmission apparatus 1 is provided with a premium-content-payment checking unit (not shown) for checking the payment of fees for vide and audio Mav that are premium contents. This check is made based on the purchase flag that is returned from the receiver side after the premium contents are purchased or rented on the receiver side. The premium-content-payment checking unit eliminates a need for a content provider to pay a visit to viewer households using content-reception apparatuses on a regular basis for the purpose of checking whether payments for premium contents are duly made. This improves usability of the content-transmission apparatus 1.

In the content-transmission apparatus 1, the scrambling unit 5 scrambles the video-&-audio content stream (TS) by use of the scramble key Ks, thereby generating the encrypted contents (E(Mav, Ks)). The ECM-Kc generating unit 11 encrypts the related information inclusive of the scramble key Ks and the information indicative of the elapsed time of contents by use of the content key Kc, thereby generating the first encryption-key related information (E(ECM-Kc, Kc)). The Kc delivery ECM generating unit 13 encrypts the related information inclusive of the content key Kc by use of the work key Kw, thereby generating the second encryption-key related information (E(Kc delivery ECM, Kw)). The multiplexing unit 15 multiplexes the encrypted contents (E(Mav, Ks)), the first encryption-key related information (E(ECM-Kc, Kc)), and the second encryption-key related information (E(Kc delivery ECM, Kw)) to output the multiplexed, encrypted contents. A content-reception apparatus provided with a preview function receives the multiplexed encrypted contents, and plays (makes) a preview based on the information indicative of the elapsed time of contents. Such a preview is also controlled as to its duration based on the content-usage control information.

When the video and audio Mav are provided for a fee, the purchase-flag setting unit (not shown) inserts the purchase flag into the second encryption-key related information (E(Kc delivery ECM, Kw)). This purchase flag is used in checking whether the premium contents are purchased or rented. When the premium contents are purchased on the receiver side having the preview function, the purchase flag is changed to a new value, and the expiration date included in the content-usage control information is set to infinite. If the premium contents are rented, the expiration date included in the content-usage control information is set to a finite date. In this manner, viewers on the receiver side watch a preview of premium contents, and change the setting of the purchase flag according to their choice of purchasing the premium contents or renting the premium contents, thereby watching the actual premium contents on the spot.

The multiplexing unit 15 may refrain from multiplexing the second encryption-key related information (E(Kc delivery ECM, Kw)), and instead outputs the second encryption-key related information (E(Kc delivery ECM, Kw)) in response to a request from the receiver side. In this manner, the second encryption-key related information (E(Kc delivery ECM, Kw)) is transmitted separately from the encrypted contents (E(Mav, Ks)). When viewers wish to decode the encrypted contents (E(Mav, Ks)) and watch the video and audio Mav, a request is sent from the receiver end to the transmitter end, resulting in the second encryption-key related information (E(Kc delivery ECM, Kw)) being transmitted through a communication network or the like. In this configuration, a fee may be charged when the second encryption-key related information (E(Kc delivery ECM, Kw)) is transmitted, no matter whether the viewers actually watch the video and audio Mav on the receiver end. That is, fees are charged solely based on the assumption that the viewers use (watch) the video and audio Mav.

[Construction of Content-Reception Apparatus]

Figure 2:
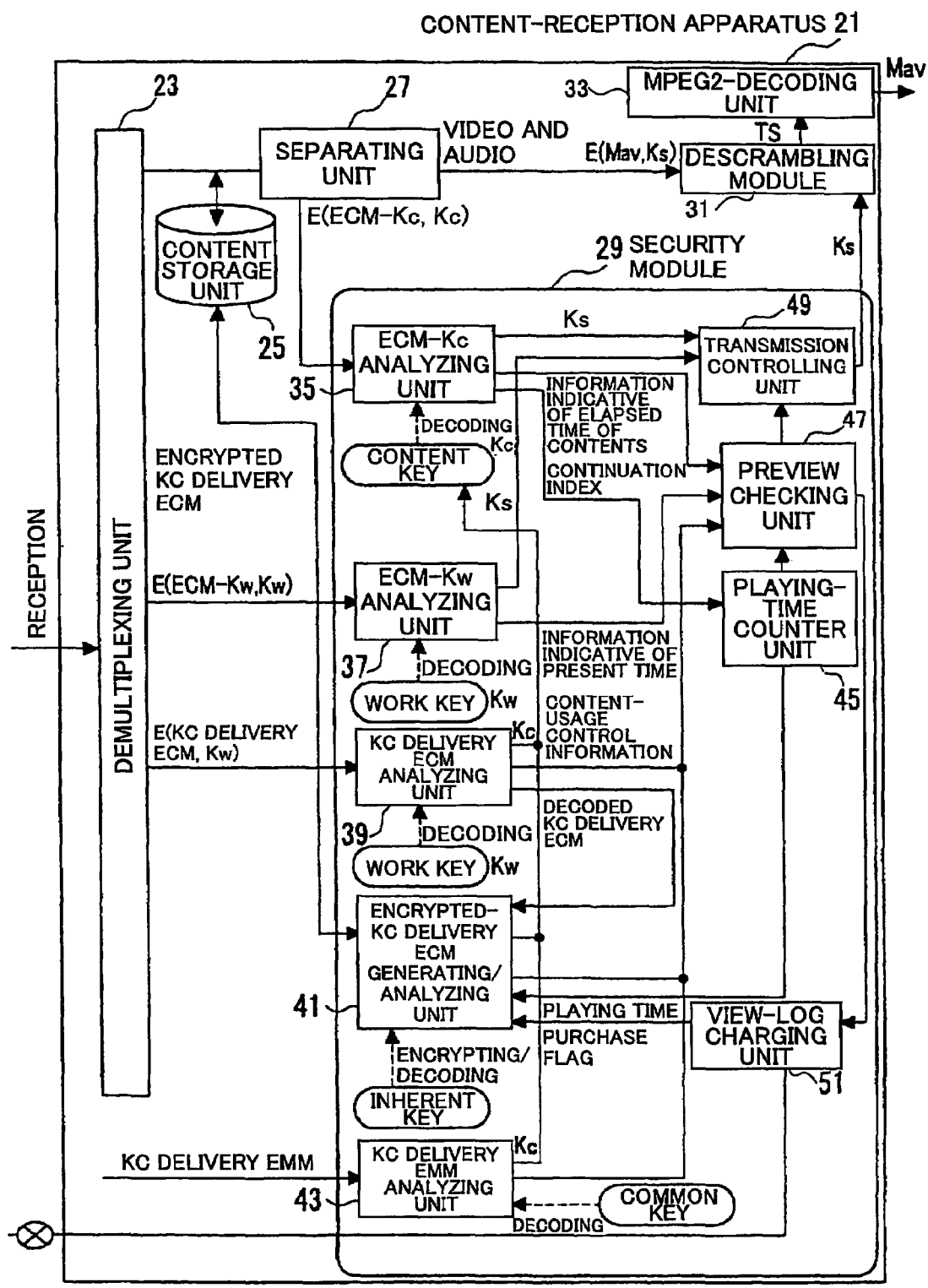
FIG. 2 is a block diagram of a content-reception apparatus.

In what follows, the construction of a content-reception apparatus will be described with reference to FIG. 2. FIG. 2 is a block diagram of a content-reception apparatus. As shown in FIG. 2, a content-reception apparatus 21 includes a demultiplexing unit 23, a content storage unit 25, a separating unit 27, a security module 29, a descrambling module 31, and an MPEG2-decoding unit 33.

The content-reception apparatus 21 receives the multiplexed encrypted contents that are transmitted from the content-transmission apparatus 1 (FIG. 1) on the transmitter side. The content reception apparatus 21 processes a portion (specified by the transmitter side) of the encrypted contents (E(Mav, Ks)) contained in the multiplexed encrypted contents so as to make it available for a preview. The content-reception apparatus 21 is configured to charge fees when the encrypted contents (E(Mav, Ks)) are purchased or rented.

The demultiplexing unit 23 receives the multiplexed encrypted contents that are transmitted from the content-transmission apparatus 1 (FIG. 1) on the transmitter side, and supplies the encrypted contents (E(Mav, Ks)) and the first encryption-key related information (E(ECM-Kc,Kc)) to the content storage unit 25. Further, the demultiplexing unit 23 supplies the first encryption-key related information for real-time reception (E(ECM-Kw, Kw)) and the second encryption-key related information (E(Kc delivery ECM, Kw)) to the security module 29. The demultiplexing unit 23 may be referred to as a separating unit.

The content storage unit 25 is implemented as a high-capacity hard-disk drive or the like, and stores the encrypted contents (E(Mav, Ks)) and the first encryption-key related information (E(ECM-Kc,Kc)) supplied from the demultiplexing unit 23. The content storage unit 25 also stores an encrypted Kc delivery ECM that is encrypted again by the security module 29 (encrypted Kc delivery ECM generating/analyzing unit 41). The content storage unit 25 may be referred to as a content storage unit.

After the encrypted contents (E(Mav, Ks)) and the first encryption-key related information (E(ECM-Kc,Kc)) received by the demultiplexing unit 23 are stored in the content storage unit 25, the separating unit 27 separates the encrypted contents (E(Mav, Ks)) and the first encryption-key related information (E(ECM-Kc,Kc)) from each other at the time of playing of stored contents. The separating unit 27 supplies the encrypted contents (E(Mav, Ks)) to the descrambling module 31, and supplies the first encryption-key related information (E(ECM-Kc,Kc)) to the security module 29.

The security module 29 is implemented as an IC card or the like, configured to store information such that the information cannot be read through external access. The security module 29 includes an ECM-Kc analyzing unit 35, an ECM-Kw analyzing unit 37, a Kc delivery ECM analyzing unit 39, the encrypted Kc delivery ECM generating/analyzing unit 41, a Kc delivery EMM analyzing unit 43, a playing-time counter unit 45, a preview checking unit 47, a transmission controlling unit 49, and view-log charging unit 51.

The ECM-Kc analyzing unit 35 functions when the stored contents are played. The ECM-Kc analyzing unit 35 decodes the first encryption-key related information (E(ECM-Kc, Kc)) supplied from the separating unit 27 by use of the content key Kc, thereby obtaining the scramble key Ks, the information indicative of the elapsed time of contents, and the continuation index. The ECM-Kc analyzing unit 35 supplies the scramble key Ks to the transmission controlling unit 49, the information indicative of the elapsed time of contents to the preview checking unit 47, and the continuation index to the playing-time counter unit 45. The content key Kc used by the ECM-Kc analyzing unit 35 is obtained by the Kc delivery ECM analyzing unit 39, the encrypted Kc delivery ECM generating/analyzing unit 41, or the Kc delivery EMM analyzing unit 43. The ECM-Kc analyzing unit 35 may be referred to as a second decoding unit.

The ECM-Kw analyzing unit 37 functions when the multiplexed encrypted contents are played in real-time as they are received by the demultiplexing unit 23. The ECM-Kw analyzing unit 37 uses the work key Kw identical to that stored in the content-transmission apparatus 1 to decode the first encryption-key related information for real-time reception (E(ECM-Kw, Kw)) separated by the demultiplexing unit 23, thereby obtaining the scramble key Ks and the information indicative of the present time. The scramble key Ks is supplied to the transmission controlling unit 49, and the information indicative of the present time is output to the preview checking unit 47.

The Kc delivery ECM analyzing unit 39 functions when the stored contents are played. The Kc delivery ECM analyzing unit 39 uses the work key Kw to decode the second encryption-key related information (E(Kc delivery ECM, Kw)) separated by the demultiplexing unit 23, thereby supplying the decoded Kc delivery ECM to the encrypted Kc delivery ECM generating/analyzing unit 41. Further, the Kc delivery ECM analyzing unit 39 obtains the content key Kc and the content-usage control information from the decoded Kc delivery ECM, and supplies the content key Kc to the ECM-Kc analyzing unit 35 and the content-usage control information to the preview checking unit 47. The Kc delivery ECM analyzing unit 39 may be referred to as a first decoding unit.

In the security module 29, the content-usage control information is combined with other information such as the elapsed time of preview playing. The information combined together is recorded in a table as an entry paired up with a corresponding one of content IDs, which are identification information attached to respective video and audio Mav's (contents). This information is referred to as content-history information.

The second encryption-key related information (E(Kc delivery ECM, Kw)) is stored in memory (not shown) provided in the Kc delivery ECM analyzing unit 39 until the encrypted contents (E(Mav, Ks)) is descrambled by the descrambling module 31.

Alternatively, the second encryption-key related information (E(Kc delivery ECM, Kw)) may be stored in the content storage unit 25 together with the encrypted contents (E(Mav, Ks)). In this case, the second encryption-key related information (E(Kc delivery ECM, Kw)) is encrypted again by the encrypted Kc delivery ECM generating/analyzing unit 41 prior to storage in the content storage unit 25.

This point will be elaborated below. The first encryption-key related information (E(ECM-Kc, Kc)) is stored in the content storage unit 25 whereas the second encryption-key related information (E(Kc delivery ECM, Kw)) is generally stored in the Kc delivery ECM analyzing unit 39 of the security module 29. This is because the second encryption-key related information (E(Kc delivery ECM, Kw)) requires much smaller memory size than the first encryption-key related information (E(ECM-Kc, Kc)). With this provision, the load is reduced on the descrambling module 31, which descrambles the encrypted contents (E(Mav, Ks)) in the content-reception apparatus 21.

The Kc delivery ECM analyzing unit 39 is provided with a second-encryption-key-related-information requesting unit (not shown) for requesting the content-transmission apparatus 1 to provide the second encryption-key related information (E(Kc delivery ECM, Kw)). This request is made via a communication network according to the intent of the user (viewer) of the content-reception apparatus 21 when the second encryption-key related information (E(Kc delivery ECM, Kw)) is not multiplexed.

The encrypted Kc delivery ECM generating/analyzing unit 41 encrypts the Kc delivery ECM that is decoded by the Kc delivery ECM analyzing unit 39. Such encryption is carried out each time the demultiplexing unit 23 receives the multiplexed encrypted contents. The encrypted Kc delivery ECM generating/analyzing unit 41 supplies the encrypted Kc delivery ECM to the content storage unit 25 for storage therein. The encrypted Kc delivery ECM generating/analyzing unit 41 modifies the content-usage control information contained in the Kc delivery ECM (i.e., the related information inclusive of the content key Kc and the content-usage control information) that is decoded by the Kc delivery ECM analyzing unit 39. This is done by referring to the playing time supplied from the playing-time counter unit 45 and by referring to the value of the purchase flag and the expiration date supplied from the view-log charging unit 51. The encrypted Kc delivery ECM generating/analyzing unit 41 encrypts the processed content-usage control information by use of an inherent key, thereby generating the encrypted Kc delivery ECM, which is then supplied to the content storage unit 25.

The encrypted Kc delivery ECM generating/analyzing unit 41 decodes the encrypted Kc delivery ECM stored in the content storage unit 25. The encrypted Kc delivery ECM generating/analyzing unit 41 obtains the content-usage control information from the decoded Kc delivery ECM, and supplies the conten-usage control information to the preview checking unit 47. The inherent key is an encryption key uniquely assigned to each security module 29.

If the security module 29 is provided with a register function, this register function can substitute for the encrypted Kc delivery ECM generating/analyzing unit 41. The encrypted Kc delivery ECM generating/analyzing unit 41 serves to protect vital information from illegal tampering or stealing where such vital information includes the content key Kc and the content-usage control information contained in the Kc delivery ECM. The encrypted Kc delivery ECM generating/analyzing unit 41 may be referred to as an encrypting unit.

The Kc delivery EMM analyzing unit 43 decodes the Kc delivery EMM supplied from a broadcast station or the like by use of a shared key, which is used in the shared-key encryption method that makes use of identical encryption keys between the transmitter side and the receiver side. This decoding process produces the content key Kc and the content-usage control information. The content key Kc is supplied to the ECM-Kc analyzing unit 35, and the content-usage control information is output to the preview checking unit 47. In this embodiment, the Kc delivery EMM analyzing unit 43 receives the Kc delivery EMM through the communication network.

The Ec-delivery purpose EMM is transmitted from the transmission side to the reception side in response to a request (order), which is sent by the user (viewer) of the content-reception apparatus 21 on the reception side to the broadcast station or the like on the transmission side. The broadcast station on the transmission side can charge fees when it receives a request for the Kc delivery EMM, based on an assumption that such request can be regarded as an indication that the encrypted contents (E(Mav, Ks)) are used. In this case, the purchase flag of the content-usage control information contained in the Kc delivery EMM is set to a value indicative of "purchase" or "rent" from the beginning. The Kc delivery EMM is an entitlement management message.

The playing-time counter unit 45 measures (counts) the playing time of the video and audio Mav, i.e., the elapsed time of a preview when a portion of the encrypted contents (E(Mav, Ks)) is previewed. The playing-time counter unit 45 supplies information indicative of the playing time to the preview checking unit 47 and the encrypted Kc delivery ECM generating/analyzing unit 41. The playing-time counter unit 45 measures not only the elapsed time of a preview but also the time length during which the encrypted contents (E(Mav, Ks)) are watched.

The playing time counted by the playing-time counter unit 45 is used by the preview checking unit 47 as one of the factors that determine whether a preview of the encrypted contents E(E(Mav, Ks)) is possible. That is, the preview checking unit 47 compares the playing time with the authorized-preview time length contained in the content-usage control information to check whether a preview is possible. This authorized-preview time length is one of the parameters used for determining whether a preview is permitted.

If the playing time is shorter than the authorized-preview time length, a further preview is possible. If the playing time has exceeded the authorized-preview time length, no preview is permitted (after the moment at which the playing time exceeds the authorized-preview time length). The detail of how the playing-time counter unit 45 measures the playing time of the video and audio Mav will be described later. The playing-time counter unit 45 may be referred to a playing-time counting unit.

The preview checking unit 47 takes into account the needs (choice) of the viewer, and checks whether a preview is possible based on the information indicative of the elapsed time of contents, the information indicative of the present time, the content-usage control information, and the information indicative of the playing time. Control information indicative of the check results is supplied to the transmission controlling unit 49. Further, the preview checking unit 47 sends accounting information about a fee for a preview and fees for a purchase and a rent, the content-usage control information including the purchase flag (i.e., the value of the purchase flag) and the updated expiration date, and the playing time counted by the playing-time counter unit 45 to the view-log charging unit 51.

The preview checking unit 47 sets the purchase flag and the expiration date of the content-usage control information based on the decisions made by the viewer. A description of the preview check and the setting of the purchase flag and the expiration date of the content-usage control information by the preview checking unit 47 will be provided in detail when operations are later described. The preview checking unit 47 may be referred to as a check unit.

The control information may indicate permission to output all the scramble keys Ks from the transmission controlling unit 49 to the exterior of the security module 29, so that all the encrypted contents (E(Mav, Ks)) can be watched. Such permission (i.e., permission to provide all the scramble keys Ks) is given when the viewer of the content-reception apparatus 21 decides to purchase or rent the encrypted contents (E(Mav, Ks)), and presses a purchase confirmation button (or rental confirmation button) on the operation unit (not shown) of the content-reception apparatus 21.

The control information may indicate permission to output only part of the scramble keys Ks from the transmission controlling unit 49 to the exterior of the security module 29, so that only part of the encrypted contents (E(Mav, Ks)) can be watched once the preview check permits a preview. Such permission (i.e., permission to provide part of the scramble keys Ks) is given when the viewer of the content-reception apparatus 21 wishes to preview the encrypted contents (E(Mav, Ks)), and presses a preview button on the operation unit (not shown) of the content-reception apparatus 21.

The control information may indicate an error, notifying a failure to provide a preview. Such error is reported when the preview check finds that the encrypted contents (E(Mav, Ks)) cannot be previewed.

The accounting information indicates "0 yen" when the encrypted contents (E(Mav, Ks)) are free of charge. The accounting information is generally "0 yen" if the preview checking unit 47 finds that the playing time of the encrypted contents (E(Mav, Ks)) is shorter than the authorized-preview time length, despite the fact that the encrypted contents (E(Mav, Ks)) are not free of charge. Even if the playing time of the encrypted contents (E(Mav, Ks)) is shorter than the authorized-preview time length, it is possible to charge fees according to the length of the playing time that is used. In this case, the accounting information indicates how much fee should be charged for a predetermined length of time in which the encrypted contents (E(Mav, Ks)) are played (e.g., 10 yen for 3 seconds). If the authorized-preview time length is 30 seconds, a total of 100 yen can be collected for a preview.

A producer who produced the video and audio Mav (i.e., encrypted contents (E(Mav, Ks))) may decide a fee, and such fee is charged when the encrypted contents (E(Mav, Ks)) are purchased. On the other hand, a situation may be different when the encrypted contents (E(Mav, Ks)) are rented. A producer who produced the video and audio Mav (i.e., encrypted contents (E(Mav, Ks))) may consult with a provider such as a broadcast station who transmitted the video and audio Mav (i.e., encrypted contents (E(Mav, Ks))), thereby together deciding a rental fee such as a few hundred yen for a prescribed time period.

The transmission controlling unit 49 temporarily holds the scramble key Ks supplied from the ECM-Kc analyzing unit 35 or the ECM-Kw analyzing unit 37. The transmission controlling unit 49 controls the transmission of the scramble key Ks to the exterior of the security module 29 (i.e., to the descrambling module 31) based on the control information provided by the preview checking unit 47.

The view-log charging unit 51 notifies the provider, through the communication network, of fees that should be charged, based on the accounting information supplied from the preview checking unit 47. The view-log charging unit 51 puts together the playing time counted by the playing-time counter unit 45 and the content-usage control information including the purchase flag (i.e., the value of the purchase flag) and the updated expiration date supplied from the preview checking unit 47, thereby generating content-history information, which is paired up with the content IDs assigned to respective video and audio Mav's. The view-log charging unit 51 supplies only the value of the purchase flag and the expiration date to the encrypted Kc delivery ECM generating/analyzing unit 41 among all the information included in the content-history information. The view-log charging unit 51 may be referred to as a charging unit.

The descrambling module 31 decodes the encrypted contents (E(Mav, Ks)) by use of the scramble key Ks, which is output from the transmission controlling unit 49 of the security module 29, thereby generating a MPEG2 video-&-audio content stream (TS). If the MPEG2 video-&-audio content stream (TS) descrambled by the descrambling module 31 is part of the encrypted contents (E(Mav, Ks)), such stream can be referred to as a preview of the video and audio Mav.

The MPEG2-decoding unit 33 decodes the MPEG2 video-&-audio content stream (TS) supplied from the descrambling module 31, and transmits the decoded video and audio Mav to a display apparatus (not shown) provided outside the content-reception apparatus 21. The descrambling module 31 and the MPEG2-decoding unit 33 may be referred to as a content decoding unit.

In the content-reception apparatus 21 as described above, the demultiplexing unit 23 receive the multiplexed encrypted contents supplied from the content-transmission apparatus 1 on the transmitter side, and separates them into the encrypted contents (E(Mav, Ks)) and the first encryption-key related information (E(ECM-Kc, Kc)), the first encryption-key related information for real-time reception (E(ECM-Kw, Kw)), and the second encryption-key related information (E(Kc delivery ECM, Kw)). The content storage unit 25 stores the encrypted contents (E(Mav, Ks)) and the first encryption-key related information (E(ECM-Kc, Kc)).

At the time of playing the stored contents, the Kc delivery ECM analyzing unit 39 decodes the second encryption-key related information (E(Kc delivery ECM, Kw)) by the work key Kw, thereby generating the content key Kc and the content-usage control information. The ECM-Kc analyzing unit 35 decodes the first encryption-key related information (E(ECM-Kc, Kc)) by the content key Kc, thereby obtaining the information indicative of the elapsed time of contents.

By taking into account the request of the viewer, the preview checking unit 47 checks whether the video and audio Mav (contents) are to be previewed (if permitted for preview), purchased, or rented, based on the information indicative of the elapsed time of contents and the content-usage control information. Based on the check results, the expiration date and the purchase flag of the content-usage control information are modified, and the control information (indicating the number of scramble keys Ks that are to be transmitted) is provided. The descrambling module 31 and the MPEG2-decoding unit 33 process the encrypted contents (E(Mav, Ks)) for output as the video and audio Mav (contents or a preview of contents). With this provision, a preview can be watched at the time of playing the stored contents, and the playing time of contents can be controlled based on the information indicative of the elapsed time of contents and the content-usage control information. This achieves diligent preview control.

In the content-reception apparatus 21, the playing-time counter unit 45 counts the playing time of contents as the encrypted contents (E(Mav, Ks)) are decoded by the scramble keys Ks for playing. The view-log charging unit 51 controls the purchase flag included in the content-usage control information, and charges fees for the playing time counted by the playing-time counter unit 45 if the purchase flag indicates fee-charging for the encrypted contents. It should be noted, however, that the view-log charging unit 51 does not charge fees until the playing time exceeds the authorized-preview time length. This is done based on the check made by the preview checking unit 47, which compares the playing time with the authorized-preview time length defined in advance in the content-usage control information. Namely, no fee is charged if the playing time is shorter than the authorized-preview time length. Alternatively, a fee can be charged for any type of playing.

The content-reception apparatus 21 is provided with the security module 29, which stores information in such a manner as to protect it from external access. The preview checking unit 47 compares the playing time with the authorized-preview time length inside the security module 29, so that the check is performed without any risk of having the playing time and the authorized-preview time length being tampered.

In the content-reception apparatus 21, the content-usage control information included in the second encryption-key related information (E(Kc delivery ECM, Kw)) is organized and combined with the playing time counted by the playing-time counter unit 45, thereby creating the content-history information, which is paired up with the content IDs assigned to respective encrypted contents (E(Mav, Ks)). This is done when the second encryption-key related information (E(Kc delivery ECM, Kw)) is handled inside the security module 29. With this provision, the content producer, the broadcast provider, or the like, who provided the video and audio Mav (contents), can arrange for the security module 29 to output the content-history information (i.e., can obtain the content-history information). Based on the obtained content-history information, the content producer, the broadcast provider, or the like can closely monitor the usage of the video and audio Mav (contents).

In the content-reception apparatus 21, the preview checking unit 47 compares the playing time with the authorized-preview time length, and if the playing time has not exceeded the authorized-preview time length, the encrypted Kc delivery ECM generating/analyzing unit 41 obtains the encrypted Kc delivery ECM by encrypting the content-history information and the related information inclusive of the content key Kc by use of the inherent key of the security module 29. The encrypted Kc delivery ECM is then stored in the content storage unit 25. Accordingly, there is no risk of suffering illegal tampering on the content-history information, the content key Kc, and so on stored in the content storage unit 25 separate from the security module 29. The content-history information and the content key Kc are thus safely protected. The security module 29 may be provided with a register function (memory: nonvolatile memory device) for storing the content-history information and the content key Kc, thereby keeping the content-history information and the content key Kc in safety.

In the content-reception apparatus 21, the second encryption-key related information (E(Kc delivery ECM, Kw)) is decoded inside the security module 29 each time the demultiplexing unit 23 receives a multiplexed encrypted content. This decoding produces Kc delivery ECM, which is then encrypted by the encrypted Kc delivery ECM generating/analyzing unit 41 for storage in the content storage unit 25 together with the encrypted contents (E(Mav, Ks)). This information stored in the content storage unit 25 is referred to as the encrypted Kc delivery ECM. With this provision, the Kc delivery ECM stored in the content storage unit 25 separate from the security module 29 can safely be protected from illegal tampering or the like.

The view-log charging unit 51 of the content-reception apparatus 21 transmits the information indicative of the purchasing/renting of the premium contents (i.e., the value of the purchase flag) to the content-transmission apparatus 1 via the communication network. Based on this information, the broadcast provider using the content-transmission apparatus 1 can check the payment of fees for the premium contents.

When the second encryption-key related information (E(Kc delivery ECM, Kw)) is not multiplexed in the multiplexed encrypted contents received by the demultiplexing unit 23 of the content-reception apparatus 21, the second-encryption-key-related-information requesting unit provided in the Kc delivery ECM analyzing unit 39 sends a request to the content-transmission apparatus 1 via the communication network so as to obtain the second encryption-key related information (E(Kc delivery ECM, Kw)). When the encrypted contents (E(Mav, Ks)) are provided for a fee, the view-log charging unit 51 charges a fee at the time of receipt of the second encryption-key related information (E(Kc delivery ECM, Kw)). Namely, the view-log charging unit 51 can operate based on the Kc-delivery accounting method (i.e., a method by which fees are charged at the time of receipt of the content key Kc). In this manner, the content-reception apparatus 21 can operate according to both the Kc-delivery accounting method and the ViewLog-accounting method (i.e., a method by which fees are charged according to how long the contents are actually watched (played)).

[Operation of Content-Transmission Apparatus]

FIG. 3 is a flowchart showing the operation of the content-transmission apparatus 1. A description of this operation will now be given.

The MPEG2 encoder unit 3 of the content-transmission apparatus 1 receives and encodes the video and audio Mav (contents), thereby supplying the MPEG2 video-&-audio content stream (TS) to the scrambling unit 5 (S1).

The scrambling unit 5 scrambles the video-&-audio content stream (TS) by use of the scramble key Ks to supply the encrypted contents (E(Mav, Ks)) to the multiplexing unit 15 (S2). The scramble key Ks used by the scrambling unit 5 is combined with additional information to be provided as the related information inclusive of the scramble key Ks. The related information inclusive of the scramble key Ks is then input to the ECM-Kw generating unit 7 and the ECM-Kc generating unit 11. Further, information indicative of the present time is input into the ECM-Kw generating unit 7.

The ECM-Kw generating unit 7 encrypts the related information inclusive of the scramble key Ks and the information indicative of the present time by use of the work key Kw, thereby generating the first encryption-key related information for real-time reception (E(ECM-Kw, Kw)), which is supplied to the multiplexing unit 15 (S3).

The content-transmission controlling unit 9 supplies the information indicative of the elapsed time of contents and the continuation index to the ECM-Kc generating unit 11, and also supplies the content-transmission information to the multiplexing unit 15 (S4). The ECM-Kc generating unit 11 encrypts the related information inclusive of the scramble key Ks, the information indicative of the elapsed time of contents, and the continuation index by use of the content key Kc, thereby generating the first encryption-key related information (E(ECM-Kc, Kc)), which is supplied to the multiplexing unit 15(S5). The content key Kc used by the ECM-Kc generating unit 11 is combined with additional information so as to be provided as the related information inclusive of the content key Kc. The related information inclusive of the content key Kc is input into the Kc delivery ECM generating unit 13. Further, the information indicative of the elapsed time of contents is input into the ECM-Kc generating unit 11.

The Kc delivery ECM generating unit 13 encrypts the related information inclusive of the content key Kc and the content-usage control information by use of the work key Kw, thereby generating the second encryption-key related information (E(Kc delivery ECM, Kw)), which is supplied to the multiplexing unit 15 (S6). The multiplexing unit 15 multiplexes the encrypted contents (E(Mav, Ks)), the first encryption-key related information for real-time reception (E(ECM-Kw, Kw), the first encryption-key related information (E(ECM-Kc, Kc)), the content-transmission information, and the second encryption-key related information (E(Kc delivery ECM, Kw)), thereby generating the multiplexed encrypted contents, which are then transmitted (S7).

[Operation of Content-Reception Apparatus]

Figure 4B:
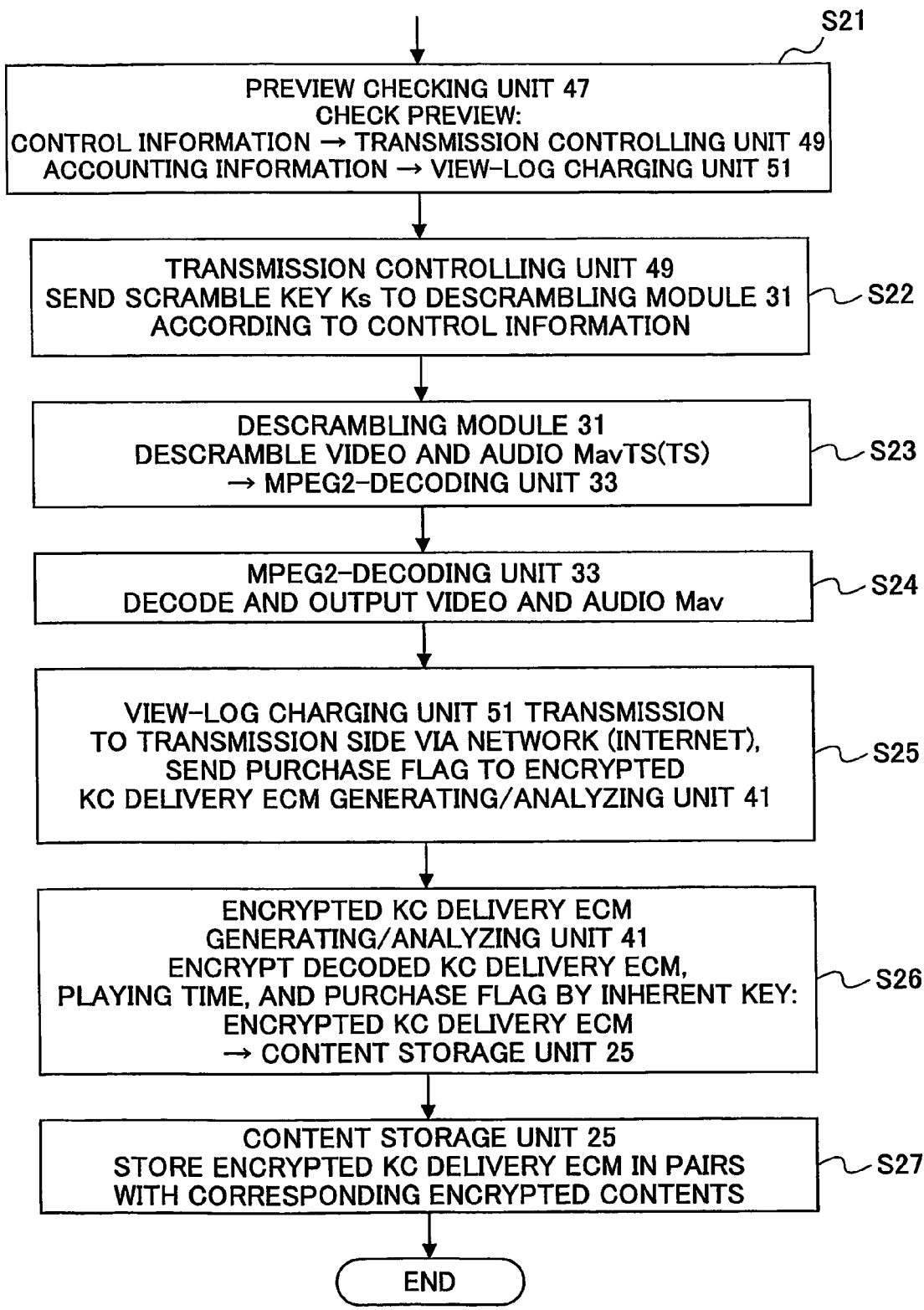

FIGS. 4A and 4B are a flowchart showing the operation of the content-reception apparatus 21. A description of this operation will now be described. In the description of the operation of the content-reception apparatus 21 that follows, a schematic review is given with regard to the reception of the multiplexed encrypted contents transmitted from the content-transmission apparatus 1, the playing of the contents, and other relevant operations that come in-between. The operation of the preview checking unit 47, which is the main part of the content-reception apparatus 21, will be described with reference to the flowchart of FIG. 5. Further, the operation of the content-reception apparatus 21 will be given by referring only to the information relevant to the decoding or descrambling of the multiplexed encrypted contents.

The multiplexed encrypted contents transmitted by the content-transmission apparatus 1 are received by the demultiplexing unit 23 of the content-reception apparatus 21 (S11). The user (viewer) of the content-reception apparatus 21 decides whether to watch (play) the video and audio Mav (contents) in real-time as they are received or to watch (play) the video and audio Mav (contents) at a later time after storing the contents in the content storage unit 25. That is, a decision is made as to whether the contents are played at the time of reception (the real-time reception and playing) or are played from the storage (the playing of stored contents).

When the user (viewer) of the content-reception apparatus 21 presses the play button on the operation unit (not shown) of the content-reception apparatus 21, the content-reception apparatus 21 uses its main control unit (not shown) to check whether to perform real-time reception and playing (S12). If it is ascertained that real-time reception and playing is to be performed (Yes at S12), the demultiplexing unit 23 separates the multiplexed encrypted contents, resulting in the encrypted contents (E(Mav, Ks)) being stored in the content storage unit 25, immediately followed by (almost simultaneously with) the encrypted contents (E(Mav, Ks)) being supplied to the separating unit 27, and the first encryption-key related information for real-time reception (E(ECM-Kw, Kw)) being supplied to the ECM-Kw analyzing unit 37 of the security module 29 (S13).

The separating unit 27 supplies the encrypted contents (E(Mav, Ks)) to the descrambling module 31 (S14). The ECM-Kw analyzing unit 37 decodes the first encryption-key related information for real-time reception (E(ECM-Kw, Kw)) by use of the work key Kw to obtain the scramble key Ks and the information indicative of the present time. The scramble key Ks is provided to the transmission controlling unit 49, and the information indicative of the present time is supplied to the preview checking unit 47 (S15).

If it is found at S12 that real-time reception and playing is not to be performed (No at S12), i.e., if the playing of stored contents is to be performed, the demultiplexing unit 23 separates the multiplexed encrypted contents into the encrypted contents (E(Mav, Ks)), the first encryption-key related information (E(ECM-Kc, Kc)), and the second encryption-key related information (E(Kc delivery ECM, Kw)). The encrypted contents (E(Mav, Ks)) and the first encryption-key related information (E(ECM-Kc, Kc)) are provided to the content storage unit 25, and the second encryption-key related information (E(Kc delivery ECM, Kw)) is supplied to the Kc delivery ECM analyzing unit 39 of the security module 29 (S16).

The content storage unit 25 stores the encrypted contents (E(Mav, Ks)) and the first encryption-key related information (E(ECM-Kc, Kc)). There is then a wait until the play button on the operation unit (not shown) is pressed according to the intent of the user (viewer) of the content-reception apparatus 21. When the play button is pressed (for the playing of stored contents), the encrypted contents (E(Mav, Ks)) and the first encryption-key related information (E(ECM-Kc, Kc)) are supplied to the separating unit 27 (S17). The separating unit 27 separates the encrypted contents (E(Mav, Ks)) and the first encryption-key related information (E(ECM-Kc, Kc)) from each other, supplying the encrypted contents (E(Mav, Ks)) to the descrambling module 31 and the first encryption-key related information (E(ECM-Kc, Kc)) to the ECM-Kc analyzing unit 35 of the security module 29 (S18).

The Kc delivery ECM analyzing unit 39 decodes the second encryption-key related information (E(Kc delivery ECM, Kw)) by use of the work key Kw, thereby obtaining the content key Kc and the content-usage control information, with the content key Kc being supplied to the ECM-Kc analyzing unit 35, and the content-usage control information being supplied to the preview checking unit 47 (S19). The ECM-Kc analyzing unit 35 decodes the first encryption-key related information (E(ECM-Kc, Kc)) by the content key Kc, resulting in the scramble key Ks, the information indicative of the elapsed time of contents, and the continuation index being obtained. The scramble key Ks is supplied to the transmission controlling unit 49, the information indicative of the elapsed time of contents supplied to the preview checking unit 47, and the continuation index supplied to the playing-time counter unit 45 (S20). A further description will be provided below with reference to FIG. 5.

The preview checking unit 47 checks a preview (as to whether a preview is possible), and supplies control information to the transmission controlling unit 49, also supplying the accounting information, the value of the purchase flag, and the expiration date to the view-log charging unit 51 (S21). Based on the control information, the transmission controlling unit 49 controls the scramble keys Ks that are to be supplied to the descrambling module 31 (S22). The descrambling module 31 receives the scramble key Ks, and descrambles the encrypted contents (E(Mav, Ks)) to produce the MPEG2 video-&-audio Mav content stream (TS), which is supplied to the MPEG2-decoding unit 33 (S23). The MPEG2-decoding unit 33 decodes the MPEG2 video-&-audio Mav content stream (TS) to produce the video and audio Mav (contents) (S24).

Having received the accounting information, the value of the purchase flag, and the expiration date from the preview checking unit 47, the view-log charging unit 51 transmits the accounting information and the value of the purchase flag to the transmitter side via the communication network, and also supplies the value of the purchase flag and the expiration date to the encrypted Kc delivery ECM generating/analyzing unit 41 (S25). Based on the accounting information, a display unit (not shown) will display the charged fees.

The Kc delivery ECM decoded by the Kc delivery ECM analyzing unit 39 is supplied to the encrypted Kc delivery ECM generating/analyzing unit 41. The encrypted Kc delivery ECM generating/analyzing unit 41 uses the inherent key to encrypt the value of the purchase flag and the expiration date supplied from the view-log charging unit 51. The encrypted Kc delivery ECM generating/analyzing unit 41 further uses the inherent key to encrypt the content-history information, which includes the content-usage control information contained in the Kc delivery ECM and the playing time counted by the playing-time counter unit 45. The encrypted Kc delivery ECM is thus obtained, and is supplied to the content storage unit 25 (S26).

The encrypted Kc delivery ECM and the encrypted contents (E(Mav, Ks)) are arranged in pairs for storage in the content storage unit 25 (S27).

FIG. 5 is a flowchart showing the operation of the preview checking unit 47. With reference to FIG. 5, this operation will be described in connection with the purchasing or renting of contents after a preview.

The preview checking unit 47 checks whether the purchase flag defined in the content-usage control information indicates free contents (S31). If it is found that the purchase flag indicates free contents (Yes at S31), the preview checking unit 47 sends control information to the transmission controlling unit 49 to inform that all the scramble keys Ks can be transmitted, and information indicative of fees (0 yen) is supplied to the view-log charging unit 51 (S34). If it is found at S31 that the purchase flag does not indicate free contents (No at S31), the contents are provided for a fee, and a check is made as to whether the purchase flag indicates that the contents have already been purchased (S32).

If the purchase flag indicates that the contents have already been purchased (Yes at S32), the expiration date of the content-usage control information is set to an infinite (S33). The preview checking unit 47 provides the transmission controlling unit 49 with the control information indicative of permission to transmit all the scramble keys Ks, and supplies the accounting information (content fee) to the view-log charging unit 51 (S34).

If it is found at S32 that the purchase flag does not indicate that the contents have already been purchased (No at S32), a message is presented on the display unit (not shown), prompting the user (viewer) of the content-reception apparatus 21 to enter a response indicative of whether to wish a preview (S35). If the user (viewer) of the content-reception apparatus 21 does not wish a preview, a preview-cancel button on the operation unit (not shown) of the content-reception apparatus 21 is pressed (No at S35). A control signal generated by the pressing of the button causes the preview checking unit 47 of the content-reception apparatus 21 to stop operating without showing a preview.

If the user (viewer) of the content-reception apparatus 21 wishes a preview at S35, a preview button on the operation unit (not shown) of the content-reception apparatus 21 is pressed (Yes at S35). A control signal generated by the pressing of the button causes the preview checking unit 47 of the content-reception apparatus 21 to check whether the present time (permitted preview point) is situated between the preview start time and the preview end time (permitted preview period) included in the content-usage control information (S36). If it is found that the present time (permitted preview point) is situated between the preview start time and the preview end time (permitted preview period) (Yes at S36), the playing time is obtained from the playing-time counter unit 45 (S37).

A check is then made as to whether the playing time obtained from the playing-time counter unit 45 is within the authorized-preview time length defined in the content-usage control information (S38). If the playing time is within the authorized-preview time length (Yes at S38), a preview is permitted. In this case, control information indicative of permission to transmit part of the scramble keys Ks is supplied to the transmission controlling unit 49, and the accounting information (0 yen or a certain fee amount commensurate with the preview time length) is provided to the view-log charging unit 51 (S39).

The user (viewer) of the content-reception apparatus 21 may press a purchase button on the operation unit (not shown) of the content-reception apparatus 21 after watching a preview (Yes at S40). In this case, a control signal generated by the pressing of the button causes the preview checking unit 47 of the content-reception apparatus 21 to modify the purchase flag to a flag value indicative of a "purchased" status and also to modify the expiration date to infinite in the content-usage control information (S41). The preview checking unit 47 supplies control information to the transmission controlling unit 49 to permit the transmission of all the scramble keys Ks, and also supplies the accounting information (content fees) to the view-log charging unit 51 (S34).

The user (viewer) of the content-reception apparatus 21 may press a rental button (Yes at S42) instead of the purchase button (No at S40) on the operation unit (not shown) of the content-reception apparatus 21 after watching a preview. In this case, a control signal generated by the pressing of the button causes the preview checking unit 47 of the content-reception apparatus 21 to modify the purchase flag to a flag value indicative of a "rented" status and also to modify the expiration date to a finite date (i.e., a finite rental period) in the content-usage control information (S43). The preview checking unit 47 supplies control information to the transmission controlling unit 49 to permit the transmission of all the scramble keys Ks, and also supplies the accounting information (a fee amount commensurate with the rental period) to the view-log charging unit 51 (S34).

If the permitted-preview period has expired (No at S36), or if the playing time is not within the authorized-preview time length (No at S38), the preview checking unit 47 stops operating without presenting a preview. If neither the purchase button nor the rental button is pressed (No at S42), the preview checking unit 47 stops operating, with the playing-time counter unit 45 having counted the playing time of a preview.

[Information Indicative of Elapsed Time of Contents]

Figure 6:
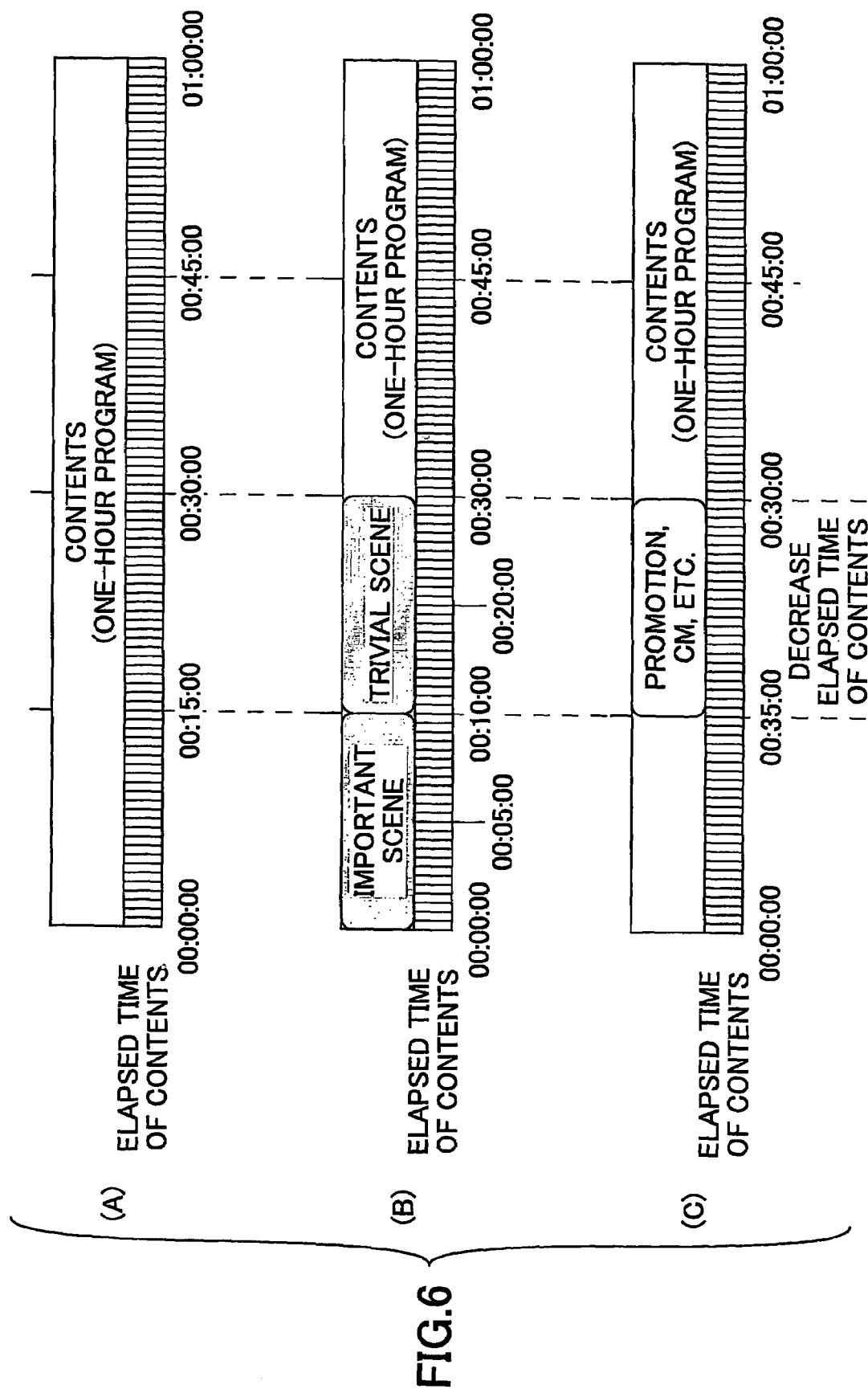
FIG. 6 is an illustrative drawing for explaining information indicative of the elapsed time of contents.

FIG. 6 is an illustrative drawing for explaining the information indicative of the elapsed time of contents.

FIG. 6 shows an illustrative example of how the information indicative of the elapsed time of contents is provided for the contents of a one-hour program. FIG. 6-(A) illustrates a case in which the information indicative of the elapsed time of contents represents the passage of time that is identical to the normal playing time (actual playing time), and FIG. 6-(B) illustrates a case in which the information indicative of the elapsed time of contents represents the passage of time that is different from the normal playing time. FIG. 6-(C) illustrates a case in which the information indicative of the elapsed time of contents represents the passage of time that is different from the normal playing time (i.e., the passage of time that decreases).

The information indicative of the elapsed time of contents shown in FIG. 6-(A) represents the passage of time that is identical to the actual playing time. The information indicative of the elapsed time of contents corresponds to the passage of time that increases from the start of contents as the contents are continually played. The content-reception apparatus 21 thus easily generates a preview corresponding to the elapsed time of contents when a preview is to be presented.

The information indicative of the elapsed time of contents shown in FIG. 6-(B) represents the passage of time that differs from the actual playing time along the time axis. As shown in the figure, the elapsed time varies depending on the contents, with coarse allocation for a trivial scene and dense allocation for a significant scene. That is, the allocation of elapsed time is not evenly made. When the content-reception apparatus 21 presents a preview of the contents, it is thus easy to control the preview of the contents according to the intent of the transmitter side (the intent of the producer such as a broadcast station who produced the contents).

The information indicative of the elapsed time of contents shown in FIG. 6-(C) represents the passage of time that differs from the actual playing time along the time axis. As shown in the figure, the elapsed time decreases with time in respect of a promotion, a commercial, or the like that is not directly related (not important) to the actual contents. With this provision, the previewing of a promotion, a commercial, or the like results in an increase of the playing time of a content preview. This provides a special treat to the viewers who watched promotions, commercials, or the like, thereby enticing viewers to buying.

The highlight portion of the contents may be set at the transmitter side such that a preview of such a highlight portion results in the heavy spending of the time for preview. This may motivate the user (viewer) of the content-reception apparatus 21 to view the entire contents, thereby enticing viewers to buying.

[Calculation by the Playing-Time Counter Unit]

Figure 7:
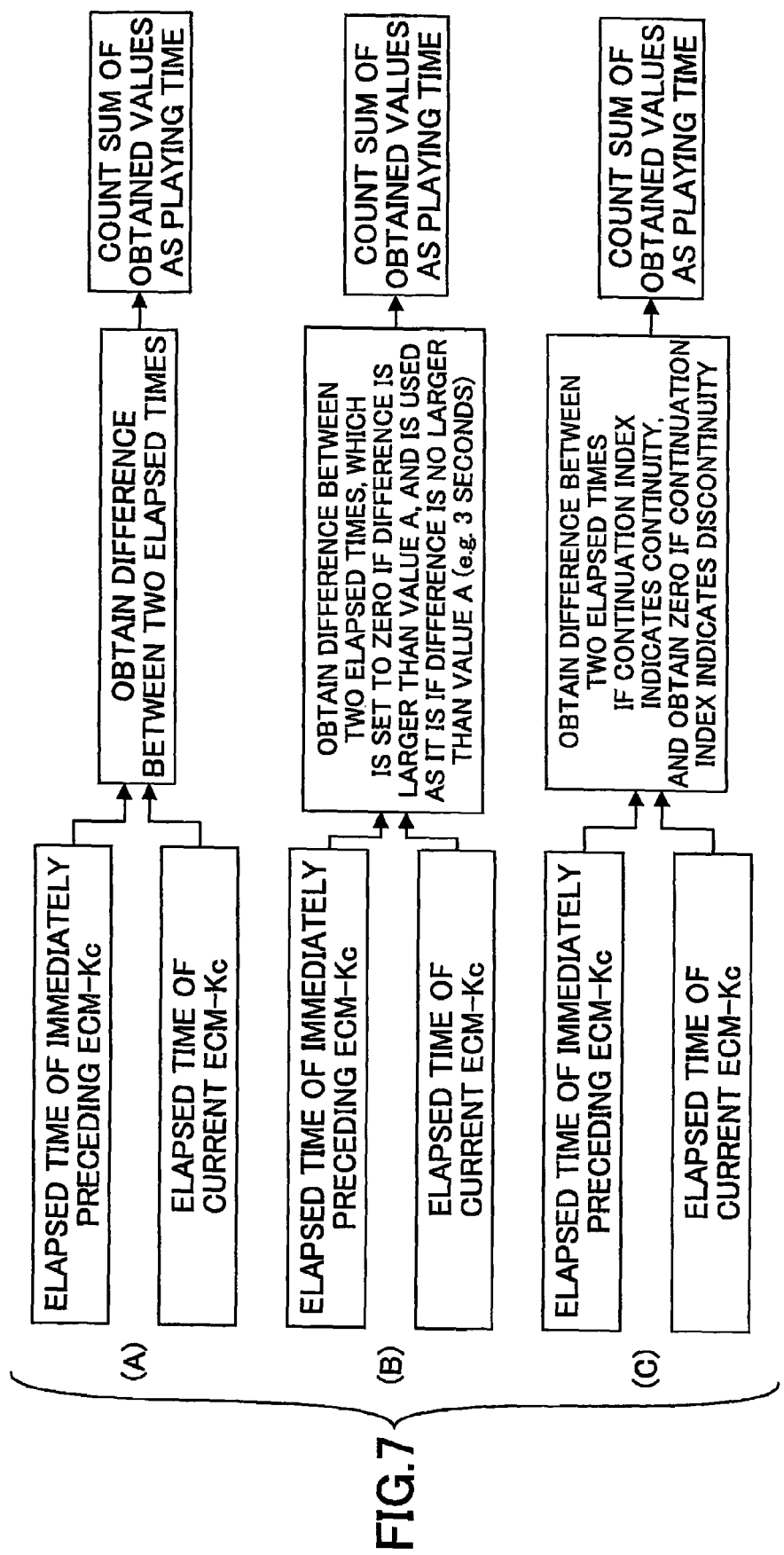
FIG. 7 is an illustrative drawing showing calculation by a playing-time counter unit.

In the following, a description will be given of calculation by the playing-time counter unit 45, i.e., how the playing time of a preview is measured. FIG. 7 is an illustrative drawing showing calculation by the playing-time counter unit 45. FIG. 7-(A) shows calculation by the playing-time counter unit 45 in the absence of a continuation index, and FIG. 7-(B) shows calculation by the playing-time counter unit 45 in the absence of a continuation index with a special design for achieving accurate counting of playing time according to certain criteria. FIG. 7-(C) shows calculation by the playing-time counter unit 45 in the presence of a continuation index.

As shown in FIG. 7, any one of the illustrated methods is designed to calculate the playing time based on the elapsed time of adjacent ECM-Kc's (i.e., the elapsed time of immediately preceding ECM-Kc and the elapsed time of current ECM-Kc). The calculation method shown in FIG. 7-(A) calculates a difference between the elapsed time of immediately preceding ECM-Kc and the elapsed time of current ECM-Kc, followed by adding up the differences and using the total as the playing time.

The calculation method shown in FIG. 7-(B) calculates a difference between the elapsed time of immediately preceding ECM-Kc and the elapsed time of current ECM-Kc. If the difference is larger than a value A (e.g., 3 seconds), the difference is regarded as zero. If the difference is no larger than A, the difference is included into (added to) calculation. A total of the differences is used as the playing time. The value A may be equal to the unit time by which the scramble key Ks changes.

The calculation method shown in FIG. 7-(C) checks the continuity of time according to the continuation index. If it is continuous, a difference between the elapsed time of immediately preceding ECM-Kc and the elapsed time of current ECM-Kc is obtained. Otherwise, the difference is regarded as zero. A total of the differences is used as the playing time.

Namely, the content-reception apparatus 21 presents a preview of a specified portion of the encrypted contents (E(Mav, Ks)). If this preview is played in a linear manner, the playing-time counter unit 45 can count the actually elapsed time as the playing time. When the preview is played in nonlinear manner, the playing time may differ from the actually elapsed time. In order to compensate for this error, the content-reception apparatus 21 uses the continuation index.

According to the method as described above, the time of nonlinear playing of a preview in respect of a specified portion of the encrypted contents (E(Mav, Ks)) can accurately be counted by the playing-time counter unit 45 based on the continuation index.

[Content-Usage Control Information & Content-History Information]

In the following, a description will be given of the content-usage control information and the content-history information with reference to FIG. 8. FIG. 8A shows the content-usage control information, and FIG. 8B shows the content-history information.

As shown in FIG. 8A, the content-usage control information includes the expiration date "02/08/06 24:00:00", the preview-start time "00:00:00", the preview-end time "00:00:15", the authorized-preview time length "00:00:20", and the purchase flag "PF".

The expiration date "02/08/06 24:00:00" indicates that the contents can be used until 24:00 hours on Aug. 6, 2002. The preview-start time "00:00:00" suggests that a preview starts at 0-second into the contents (i.e., starts from the beginning of the contents). The preview-end time "00:00:15" specifies that the preview ends at 15 seconds into the contents.

The authorized-preview time length "00:00:20" indicates that the playing of a preview is 20 seconds maximum. The purchase flag "PF" means that the contents are "PayFree", i.e., are free of charge. Here, "PF" is a value of the purchase flag. In general, the value of the purchase flag is represented by an integer, "0" indicating "for a fee" and "not yet purchased", "1" indicating "for a fee" and "already purchased", "2" indicating "for a fee" and "being rented", and "3" indicating "free of charge".

As shown in FIG. 8B, the content-history information includes the content-usage control information, the content ID, the content key Kc, and the playing time. Use of the content-history information makes it possible to achieve the batch control of content parameters. In this embodiment, the content-history information is controlled by the view-log charging unit 51 of the security module 29.

[Contents with Preview-Purpose Content]

In what follows, a description will be given of contents that have a preview-purpose content attached in advance, and a comparison with the conventional contents will be made.

Figure 9A:
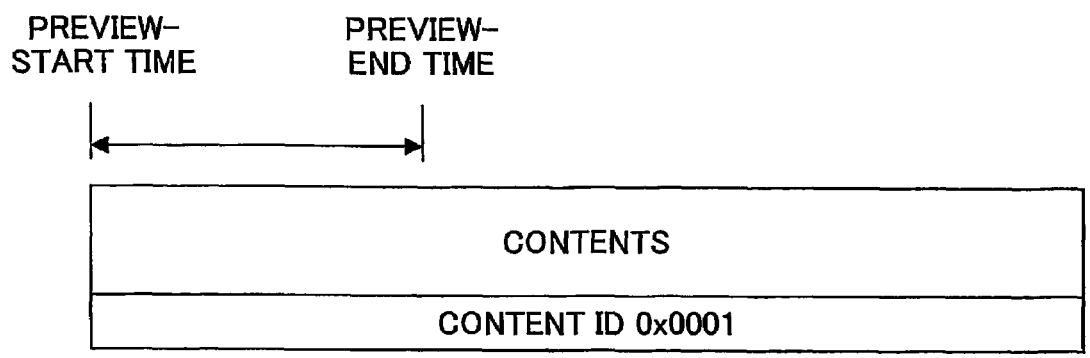
FIG. 9A is an illustrative drawing showing a preview of conventional contents.
Figure 9B:
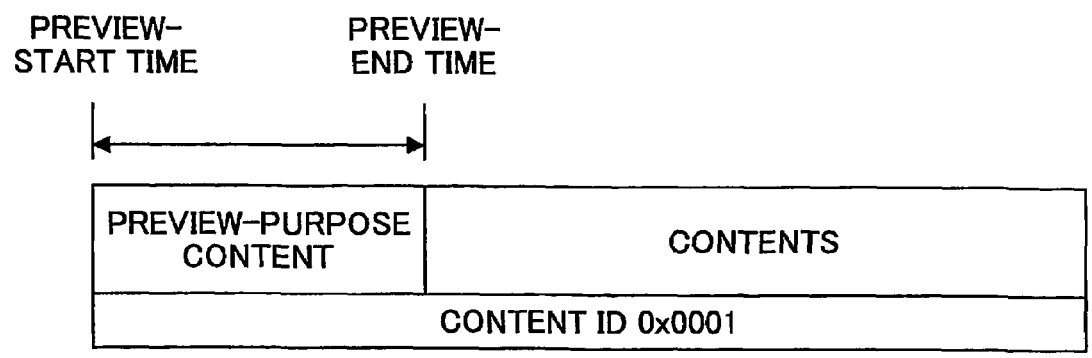
FIG. 9B is an illustrative drawing showing a preview of contents that have a preview-purpose content attached in advance.

FIG. 9A is an illustrative drawing showing a preview of conventional contents. FIG. 9B is an illustrative drawing showing a preview of contents that have a preview-purpose content attached in advance. As shown in FIG. 9A, a preview of conventional contents allows viewers on the receiver side to watch only the beginning of the contents as indicated by the preview-start time and the preview-end time. In FIG. 9B, on the other hand, a preview-purpose content is attached to the beginning of the contents in advance where such content is made by extracting desired portion(s) of the contents.

The content-reception apparatus 21 controls the use of the preview-purpose content based on the information indicative of the elapsed time of contents and the content-usage control information. With this provision, a preview can be edited and produced according to the intent of the transmitter side, and it is possible to let viewers on the receiver side watch a preview-purpose content according to the information indicative of the elapsed time of contents and the content-usage control information.

Although the present invention has been described with reference to a particular embodiment, the invention is not limited to this particular disclosure.

For example, processes performed by individual components of the content-transmission apparatus 1 and the content-reception apparatus 21 may be taken as individual steps, thereby conceiving a method of transmitting contents and a method of receiving contents. By the same token, processes performed by individual components of the content-transmission apparatus 1 and the content-reception apparatus 21 may be taken as individual program components of a content-transmission program and a content-reception program, which may be written in a computer language executable by a general-purpose computer.

Such embodiments will offer the same advantages as the content-transmission apparatus 1 and the content-reception apparatus 21. Further, the content-transmission program and the content-reception program may be distributed in the form of record medium.

Further, the present invention is not limited to these embodiments, but various variations and modifications may be made without departing from the scope of the present invention.

The invention claimed is:

1. A method of transmitting contents, which are to be received at a reception side where a portion of contents is previewed while the contents are not accessible for playing other than for a preview purpose, comprising the steps of:

encrypting the contents by a first encryption key;

generating information indicative of an elapsed time of the contents that indicates a relationship between positions on a time axis of the contents representing an amount of time that passes as the contents are played and a time count that accrues as a preview time when the contents are previewed;

encrypting the first encryption key and the information indicative of an elapsed time of the contents by a second encryption key, thereby generating first encrypted information;

encrypting the second encryption key and content-usage control information by a third encryption key, thereby generating second encrypted information, said content-usage control information indicating usage of the contents on the reception side; and transmitting the encrypted contents, the first encrypted information, and the second encrypted information to the reception side, wherein the information indicative of the elapsed time of the contents is arranged such that the time count indicates a first time length accrued as the preview time for passage of a predetermined time length on the time axis of the contents at a first portion of the contents, and indicates a second time length accrued as the preview time for passage of the predetermined time length on the time axis of the contents at a second portion of the contents, the first time length being different from the second time length wherein said first time length increases while said second time length decreases.

2. An apparatus for transmitting contents, which are to be received at a reception side where a portion of contents is previewed while the contents are not accessible for playing other than for a preview purpose, comprising the steps of:

a content encrypting unit which encrypts the contents by a first encryption key;

a content-transmission controlling unit which generates information indicative of an elapsed time of the contents that indicates a relationship between positions on a time axis of the contents representing an amount of time that passes as the contents are played and a time count that accrues as a preview time when the contents are previewed;

a first encrypting unit which encrypts the first encryption key and the information indicative of an elapsed time of the contents by a second encryption key, thereby generating first encrypted information;

a second encrypting unit which encrypts the second encryption key and content-usage control information by a third encryption key, thereby generating second encrypted information, said content-usage control information indicating usage of the contents on the reception side; and a transmission unit which transmits the encrypted contents, the first encrypted information, and the second encrypted information to the reception side, wherein the information indicative of the elapsed time of the contents is arranged such that the time count indicates a first time length accrued as the preview time for passage of a predetermined time length on the time axis of the contents at a first portion of the contents, and indicates a second time length accrued as the preview time for passage of the predetermined time length on the time axis of the contents at a second portion of the contents, the first time length being different from the second time length wherein said first time length increases while said second time length decreases.

3. The apparatus as claimed in claim 2, wherein said content-transmission control unit generates the information indicative of an elapsed time of the contents such that said time count linearly corresponds to said time axis of the contents.

4. The apparatus as claimed in claim 2, wherein said content-transmission control unit generates the information indicative of an elapsed time of the contents such that said time count is not evenly assigned to the said time axis of the contents.

5. An apparatus for transmitting contents, which are to be received at a reception side where a portion of contents is previewed while the contents are not accessible for playing other than for a preview purpose, comprising:

a content encrypting unit which encrypts the contents by a first encryption key;

a content-transmission controlling unit which generates information indicative of an elapsed time of the contents that indicates a relationship between positions on a time axis of the contents representing an amount of time that passes as the contents are played and a time count that accrues as a preview time when the contents are previewed;

a first encrypting unit which encrypts the first encryption key and the information indicative of an elapsed time of the contents by a second encryption key, thereby generating first encrypted information;

a second encrypting unit which encrypts the second encryption key and content-usage control information by a third encryption key, thereby generating second encrypted information, said content-usage control information indicating usage of the contents on the reception side; and a transmission unit which transmits the encrypted contents, the first encrypted information, and the second encrypted information to the reception side, wherein said content-transmission control unit generates the information indicative of an elapsed time of the contents such that said time count decreases with passage of time on a portion of said time axis of the contents, and increases with passage of time on another portion of said time axis of the contents.

6. The apparatus as claimed in claim 2, wherein a preview-purpose content is attached to the contents at a start of the contents.

7. The apparatus as claimed in claim 2, wherein the content-usage control information includes a purchase flag for indicating whether the contents are purchased or rented on the reception side, said purchase flag being returned from the reception side for confirmation of a payment of a fee for the contents.

8. The apparatus as claimed in claim 2, wherein said transmission unit transmits the second encrypted information separately from the encrypted contents and the first encrypted information in response to a request from the reception side.

9. A machine-readable record medium having a program embodied therein for causing a computer to transmit contents, which are to be received at a reception side where a portion of the contents is previewed while the contents are not accessible for playing other than for a preview purpose, said program comprising:
- a content encrypting unit which encrypts the contents by a first encryption key;
- a content-transmission controlling unit which generates information indicative of an elapsed time of the contents that indicates a relationship between positions on a time axis of the contents representing an amount of time that passes as the contents are played and a time count that accrues as a preview time when the contents are previewed;
- a first encrypting unit which encrypts the first encryption key and the information indicative of an elapsed time of the contents by a second encryption key, thereby generating first encrypted information;
- a second encrypting unit which encrypts the second encryption key and content-usage control information by a third encryption key, thereby generating second encrypted information, said content-usage control information indicating usage of the contents on the reception side; and
- a transmission unit which transmits the encrypted contents, the first encrypted information, and the second encrypted information to the reception side,
- wherein the information indicative of the elapsed time of the contents is arranged such that the time count indicates a first time length accrued as the preview time for passage of a predetermined time length on the time axis of the contents at a first portion of the contents, and indicates a second time length accrued as the preview time for passage of the predetermined time length on the time axis of the contents at a second portion of the contents, the first time length being different from the second time length wherein said first time length increases while said second time length decreases.

10. A method of controlling encrypted contents that are received from a transmission side, wherein a portion of the encrypted contents is previewed while the encrypted contents are not accessible for playing other than for a preview purpose, comprising the steps of:
- separating received contents into the encrypted contents, first encrypted information, and second encrypted information, the first encrypted information including a first encryption key and information indicative of an elapsed time of contents as encrypted by a second encryption key, and the second encrypted information including the second encryption key and content-usage control information as encrypted by a third encryption key;
- storing the encrypted contents and the first encrypted information in storage;
- decoding the second encrypted information by the third encryption key so as to obtain the second encryption key and the content-usage control information;
- decoding the first encrypted information stored in the storage by the obtained second encryption key so as to obtain the first encrypted key and the information indicative of an elapsed time of contents;
- checking whether a preview of said portion of the encrypted contents is permitted based on the information indicative of an elapsed time of contents and the content-usage control information; and
- decoding said portion of the encrypted contents by the first encrypted key in response to a check result that a preview of said portion of the encrypted contents is permitted,
- wherein the information indicative of an elapsed time of contents indicates a relationship between positions on a time axis of contents representing an amount of time that passes as the contents are played and a time count that accrues as a preview time when the contents are previewed, and
- wherein the information indicative of the elapsed time of the contents is arranged such that the time count indicates a first time length accrued as the preview time for passage of a predetermined time length on the time axis of the contents at a first portion of the contents, and indicates a second time length accrued as the preview time for passage of the predetermined time length on the time axis of the contents at a second portion of the contents, the first time length being different from the second time length wherein said first time length increases while said second time length decreases.

11. An apparatus for controlling encrypted contents that are received from a transmission side, wherein a portion of the encrypted contents is previewed while the encrypted contents are not accessible for playing other than for a preview purpose, comprising:
- a separating unit which separates received contents into the encrypted contents, first encrypted information, and second encrypted information, the first encrypted information including a first encryption key and information indicative of an elapsed time of contents as encrypted by a second encryption key, and the second encrypted information including the second encryption key and content-usage control information as encrypted by a third encryption key;
- a content storage unit which stores the encrypted contents and the first encrypted information in storage;
- a first decoding unit which decodes the second encrypted information by the third encryption key so as to obtain the second encryption key and the content-usage control information;
- a second decoding unit which decodes the first encrypted information stored in the storage by the obtained second encryption key so as to obtain the first encrypted key and the information indicative of an elapsed time of contents;
- a check unit which checks whether a preview of said portion of the encrypted contents is permitted based on the information indicative of an elapsed time of contents and the content-usage control information; and a content decoding unit which decodes said portion of the encrypted contents by the first encrypted key in response to a check result that a preview of said portion of the encrypted contents is permitted, wherein the information indicative of an elapsed time of contents indicates a relationship between positions on a time axis of contents representing an amount of time that passes as the contents are played and a time count that accrues as a preview time when the contents are previewed, and wherein the information indicative of the elapsed time of the contents is arranged such that the time count indicates a first time length accrued as the preview time for passage of a predetermined time length on the time axis of the contents at a first portion of the contents, and indicates a second time length accrued as the preview time for passage of the predetermined time length on the time axis of the contents at a second portion of the contents, the first time length being different from the second time length wherein said first time length increases while said second time length decreases.

12. The apparatus as claimed in claim 11, further comprising:
a playing-time counter unit which counts the time count as said portion of the encrypted contents is decoded for playing; and
a charging unit which charges a fee commensurate with the time count counted by said playing-time counter unit,
wherein said check unit compares the time count with an authorized-preview time length defined in the content-usage control information, and said charging unit refrains from charging a fee until the time count exceeds the authorized-preview time length.

13. The apparatus as claimed in claim 12, wherein said playing-time counter unit counts the time count based on a continuation index that is provided to correspond to a unit time by which said first encryption key changes.

14. The apparatus as claimed in claim 12, wherein said check unit is provided inside a security module that protects information therein from external access such as to prevent reading of the information.

15. The apparatus as claimed in claim 14, wherein said charging unit is provided inside said security module, and generates content-history information by combining the time count counted by the playing-time counter unit with the content-usage control information, said content-history information being paired up with content IDs, which are assigned to respective contents.

16. The apparatus as claimed in claim 15, further comprising an encrypting unit which encrypts the content-history information and the second encryption key by use of an inherent key kept inside said security module if the check unit funds that the time count is smaller than the authorized-preview time length, the content-history information and the second encryption key encrypted by said encrypting unit being stored in said content storage unit.

17. The apparatus as claimed in claim 16, wherein the second encrypted information is stored in said content storage unit together with the encrypted contents after encryption by said encrypting unit.

18. The apparatus as claimed in claim 12, wherein said charging unit sends a notice to the transmission side through a communication channel, said notice indicating whether the encrypted contents are purchased or rented.

19. The apparatus as claimed in claim 12, wherein a request for the second encrypted information is sent to the transmission side via a communication channel if the second encrypted information is not included in the received contents, and a fee for the encrypted contents is charged when said charging unit receives the second encrypted information.

20. A machine-readable record medium having a program embodied therein for causing a computer to control encrypted contents that are received from a transmission side, wherein a portion of the encrypted contents is previewed while the encrypted contents are not accessible for playing other than for a preview purpose, said program comprising:
a separating unit which separates received contents into the encrypted contents, first encrypted information, and second encrypted information, the first encrypted information including a first encryption key and information indicative of an elapsed time of contents as encrypted by a second encryption key, and the second encrypted information including the second encryption key and content-usage control information as encrypted by a third encryption key;
a content storage unit which stores the encrypted contents and the first encrypted information in storage;
a first decoding unit which decodes the second encrypted information by the third encryption key so as to obtain the second encryption key and the content-usage control information;
a second decoding unit which decodes the first encrypted information stored in the storage by the obtained second encryption key so as to obtain the first encrypted key and the information indicative of an elapsed time of contents;
a check unit which checks whether a preview of said portion of the encrypted contents is permitted based on the information indicative of an elapsed time of contents and the content-usage control information; and
a content decoding unit which decodes said portion of the encrypted contents by the first encrypted key in response to a check result that a preview of said portion of the encrypted contents is permitted,
wherein the information indicative of an elapsed time of contents indicates a relationship between positions on a time axis of contents representing an amount of time that passes as the contents are played and a time count that accrues as a preview time when the contents are previewed, and
wherein the information indicative of the elapsed time of the contents is arranged such that the time count indicates a first time length accrued as the preview time for passage of a predetermined time length on the time axis of the contents at a first portion of the contents, and indicates a second time length accrued as the preview time for passage of the predetermined time length on the time axis of the contents at a second portion of the contents, the first time length being different from the second time length wherein said first time length increases while said second time length decreases.

* * * * *